US009418267B1

(12) United States Patent
Josey

(10) Patent No.: US 9,418,267 B1
(45) Date of Patent: Aug. 16, 2016

(54) MODULAR RFID SHELVING

(71) Applicant: Gary L. Josey, Crossville, TN (US)

(72) Inventor: Gary L. Josey, Crossville, TN (US)

(73) Assignee: Ground Star LLC, Crossville, TN (US)

( * ) Notice: Subject to any disclaimer, the term of this patent is extended or adjusted under 35 U.S.C. 154(b) by 0 days.

(21) Appl. No.: 14/822,466

(22) Filed: Aug. 10, 2015

(51) Int. Cl.
| | |
|---|---|
| *G06Q 10/08* | (2012.01) |
| *G06Q 10/06* | (2012.01) |
| *G06K 7/00* | (2006.01) |
| *G06K 19/07* | (2006.01) |
| *G06K 7/10* | (2006.01) |
| *A47F 5/00* | (2006.01) |
| *G06K 19/077* | (2006.01) |
| *H01Q 1/22* | (2006.01) |
| *G06Q 20/20* | (2012.01) |

(52) U.S. Cl.
CPC .......... *G06K 7/10415* (2013.01); *A47F 5/0043* (2013.01); *G06K 7/0008* (2013.01); *G06K 19/0723* (2013.01); *G06K 19/07749* (2013.01); *G06Q 10/06* (2013.01); *G06Q 10/08* (2013.01); *G06Q 10/087* (2013.01); *G06Q 20/203* (2013.01); *H01Q 1/2225* (2013.01)

(58) Field of Classification Search
CPC combination set(s) only.
See application file for complete search history.

(56) References Cited

U.S. PATENT DOCUMENTS

| | | | |
|---|---|---|---|
| 3,587,479 A | 6/1971 | Geschwender | |
| 3,890,108 A | 6/1975 | Welsh | |
| 4,793,267 A | 12/1988 | Birillo | |
| 5,348,485 A * | 9/1994 | Briechle | H01R 25/14 439/110 |
| 5,683,782 A | 11/1997 | Duchêne | |
| 5,697,061 A * | 12/1997 | Krueger | G06K 7/0008 235/383 |
| 5,717,283 A | 2/1998 | Biegelsen et al. | |
| 5,775,046 A * | 7/1998 | Fanger | A47B 81/06 108/157.16 |
| 5,877,962 A * | 3/1999 | Radcliffe | G06Q 10/08 280/79.2 |
| 5,899,037 A | 5/1999 | Josey | |
| 5,992,112 A | 11/1999 | Josey | |
| 6,372,322 B1 | 4/2002 | Devaguptapu | |
| 6,389,988 B1 | 5/2002 | Frattini | |
| 6,392,544 B1 * | 5/2002 | Collins | G06K 7/0008 340/10.1 |
| 6,570,492 B1 * | 5/2003 | Peratoner | G06F 3/147 340/12.3 |
| 6,890,023 B2 | 5/2005 | Preisler et al. | |
| 7,132,945 B2 | 11/2006 | Dunlap, Jr. | |
| 7,209,039 B2 | 4/2007 | Krebs | |
| 7,275,863 B1 * | 10/2007 | Akers | G01K 11/06 116/216 |

(Continued)

FOREIGN PATENT DOCUMENTS

| | | | | |
|---|---|---|---|---|
| DE | 19856763 A1 * | 6/2000 | | B65G 1/1371 |
| EP | 1331590 A2 * | 7/2003 | | G06K 7/10079 |
| ES | WO 2007140800 A1 * | 12/2007 | | A47F 5/0043 |
| GB | 2450531 A * | 12/2008 | | F25D 29/00 |
| JP | 2006252367 A * | 9/2006 | | |
| JP | 2007004691 A * | 1/2007 | | |
| WO | 2013103833 A1 | 7/2013 | | |

OTHER PUBLICATIONS

Heckman, Mark, "Trius Retail™ Files Patent for Shelf Alive!™ Technology", Perspectives from Trius Retail, Media Release, Trius Retail LLC, Sep. 25, 2014, http://www.trius-retail.com/media-releases/1058 (1 page).

(Continued)

*Primary Examiner* — Daniel Walsh
(74) *Attorney, Agent, or Firm* — Hasse & Nesbitt LLC; Daniel F. Nesbitt

(57) ABSTRACT

A modular shelf for an integrated display structure that addresses the mutually important, yet unrelated issues of inventory control, shelf labeling and point of purchase advertising. The modular shelf has a non-metallic low density core, a molded frame secured along the outer perimeter of the core, a thermoplastic or resinous sheet secured to each of the top face and the bottom face of the core, and a plurality of antennae embedded within at least one of the top sheet and the bottom sheet. An RF or other electronic transceiver is electrically connected to the antennae secured within a cavity of the rear molded member, and a power and communications connects the RF transceiver with a front video display panel and with power and communications components in a support base of a shelf gondola.

16 Claims, 17 Drawing Sheets

(56) References Cited

U.S. PATENT DOCUMENTS

| | | | | |
|---|---|---|---|---|
| 7,525,487 B2* | 4/2009 | Burnside | | G06K 7/0008 343/700 MS |
| 7,648,065 B2* | 1/2010 | Marino | | G06Q 10/08 235/383 |
| 7,672,872 B2* | 3/2010 | Shanton | | A47F 5/11 340/5.92 |
| 7,696,897 B2* | 4/2010 | Horii | | G03B 21/13 340/5.91 |
| 7,798,652 B2 | 9/2010 | Ikeda et al. | | |
| 8,141,723 B2 | 3/2012 | Whalen et al. | | |
| 8,654,517 B2 | 2/2014 | Aumiller et al. | | |
| 8,695,878 B2* | 4/2014 | Burnside | | G06Q 10/087 235/385 |
| 2002/0190845 A1* | 12/2002 | Moore | | G06K 7/10336 340/10.3 |
| 2003/0122455 A1* | 7/2003 | Caldwell | | A47B 57/00 312/6 |
| 2003/0141962 A1* | 7/2003 | Barink | | G06K 7/10079 340/10.42 |
| 2003/0174099 A1* | 9/2003 | Bauer | | G06K 7/0008 343/893 |
| 2004/0224135 A1* | 11/2004 | Krebs | | G06K 7/0008 428/195.1 |
| 2005/0040934 A1* | 2/2005 | Shanton | | A47F 5/11 340/5.92 |
| 2005/0108098 A1 | 5/2005 | Syed et al. | | |
| 2007/0023511 A1* | 2/2007 | Smith | | G06Q 10/087 235/385 |
| 2007/0035380 A1* | 2/2007 | Overhultz | | G06Q 10/087 340/5.9 |
| 2007/0182555 A1* | 8/2007 | Walker | | G07G 1/0036 340/572.1 |
| 2007/0215700 A1* | 9/2007 | Reznik | | H01Q 1/2216 235/385 |
| 2007/0279295 A1* | 12/2007 | Nakazono | | H01Q 1/2216 343/700 MS |
| 2008/0036606 A1* | 2/2008 | Kuramoto | | G06K 7/0008 340/572.7 |
| 2008/0046345 A1* | 2/2008 | Serre | | G06Q 10/087 705/28 |
| 2008/0068173 A1* | 3/2008 | Alexis | | H01Q 1/2208 340/572.7 |
| 2008/0092782 A1* | 4/2008 | Daniel | | A47F 5/103 108/50.02 |
| 2008/0129643 A1* | 6/2008 | Itoh | | G06K 7/10346 343/878 |
| 2008/0145602 A1 | 6/2008 | Hendren et al. | | |
| 2008/0186140 A1* | 8/2008 | Kuwako | | G06K 7/0008 340/10.1 |
| 2008/0198015 A1* | 8/2008 | Lawrence | | G06K 7/0008 340/572.4 |
| 2008/0224826 A1* | 9/2008 | Kuwako | | G06K 7/0008 340/10.1 |
| 2008/0238682 A1* | 10/2008 | Kuwako | | G06K 7/0008 340/572.4 |
| 2008/0284654 A1* | 11/2008 | Burnside | | G06K 7/0008 343/700 MS |
| 2008/0314980 A1* | 12/2008 | Folcke | | G06K 7/10336 235/385 |
| 2009/0017779 A1 | 1/2009 | Bonner et al. | | |
| 2009/0018927 A1 | 1/2009 | Bonner et al. | | |
| 2009/0090583 A1 | 4/2009 | Bonner et al. | | |
| 2009/0212737 A1 | 8/2009 | Johnson et al. | | |
| 2009/0240571 A1 | 9/2009 | Bonner et al. | | |
| 2009/0248198 A1* | 10/2009 | Siegel | | G06Q 10/08 700/231 |
| 2009/0256680 A1* | 10/2009 | Kilian | | G06K 7/10178 340/10.1 |
| 2009/0265210 A1 | 10/2009 | Bonner et al. | | |
| 2009/0313089 A1 | 12/2009 | Bonner et al. | | |
| 2009/0321373 A1* | 12/2009 | Hardy | | A47F 1/12 211/59.3 |
| 2010/0012600 A1* | 1/2010 | Clontz | | A47F 5/0043 211/26 |
| 2010/0049594 A1 | 2/2010 | Bonner et al. | | |
| 2010/0057541 A1 | 3/2010 | Bonner et al. | | |
| 2010/0109839 A1 | 5/2010 | Bonner et al. | | |
| 2010/0136918 A1 | 6/2010 | Bonner et al. | | |
| 2010/0169190 A1 | 7/2010 | Allison et al. | | |
| 2010/0182149 A1* | 7/2010 | Marino | | G06K 7/10316 340/572.7 |
| 2010/0198701 A1 | 8/2010 | Bonner et al. | | |
| 2010/0262513 A1 | 10/2010 | Bonner et al. | | |
| 2010/0328037 A1* | 12/2010 | Thomas | | F25D 29/00 340/10.1 |
| 2011/0049067 A1* | 3/2011 | Garson | | A47F 1/126 211/59.3 |
| 2011/0062789 A1 | 3/2011 | Johnson et al. | | |
| 2011/0109169 A1* | 5/2011 | Shimamoto | | G06K 7/0008 307/104 |
| 2011/0145088 A1 | 6/2011 | Bonner et al. | | |
| 2011/0196243 A1 | 8/2011 | Wu et al. | | |
| 2011/0248083 A1 | 10/2011 | Bonner et al. | | |
| 2011/0266232 A1* | 11/2011 | Kahler | | A47F 5/0043 211/26 |
| 2012/0026646 A1* | 2/2012 | Thielmann | | H05K 7/1421 361/622 |
| 2012/0169503 A1 | 7/2012 | Wu et al. | | |
| 2012/0209741 A1 | 8/2012 | Bonner et al. | | |
| 2012/0228240 A1* | 9/2012 | Gentile | | A47F 5/08 211/1 |
| 2012/0245974 A1 | 9/2012 | Bonner et al. | | |
| 2013/0048724 A1* | 2/2013 | Burnside | | G06Q 10/087 235/385 |
| 2013/0088136 A1* | 4/2013 | Bassi | | F25D 25/02 312/408 |
| 2013/0176398 A1* | 7/2013 | Bonner | | G09F 19/18 348/46 |
| 2013/0248593 A1 | 9/2013 | Bonner et al. | | |
| 2013/0341292 A1* | 12/2013 | Johnson | | A47F 1/126 211/1.57 |
| 2013/0342022 A1* | 12/2013 | Browning | | G09F 9/30 307/104 |
| 2013/0343014 A1* | 12/2013 | Browning | | A47F 3/001 361/752 |
| 2014/0027397 A1 | 1/2014 | Knoll et al. | | |
| 2014/0041407 A1* | 2/2014 | Bush | | A47F 3/0491 62/251 |
| 2014/0167919 A1* | 6/2014 | Singh | | A47B 43/00 340/10.1 |
| 2014/0224875 A1* | 8/2014 | Slesinger | | H01R 25/142 235/385 |
| 2015/0023000 A1* | 1/2015 | Kendall | | F25D 25/02 362/92 |
| 2015/0041616 A1* | 2/2015 | Gentile | | G06Q 10/087 248/550 |
| 2015/0115029 A1* | 4/2015 | Rahim | | G06F 19/30 235/385 |
| 2015/0304611 A1* | 10/2015 | Nakase | | G06K 7/10415 348/143 |
| 2016/0035012 A1* | 2/2016 | Abell | | G06Q 30/0641 705/27.1 |
| 2016/0055447 A1* | 2/2016 | Sehmer | | G06Q 10/087 235/385 |
| 2016/0078263 A1* | 3/2016 | Zollinger | | G06Q 10/087 |

OTHER PUBLICATIONS

Demla, Anita, et al., "Point of Purchase Advertising Deck" Point of Purchase Advertising, http://www.slideshare.net/slickchickit/finaldeck, Feb. 3, 2012 (6 pages).

Swedberg, Claire, "Two Food Chains Trial RFID-based Shelf Labels", RFID Journal, Mar. 30, 2009, http://www.rfidjournal.com/articles/view?4737 (2 pages).

* cited by examiner

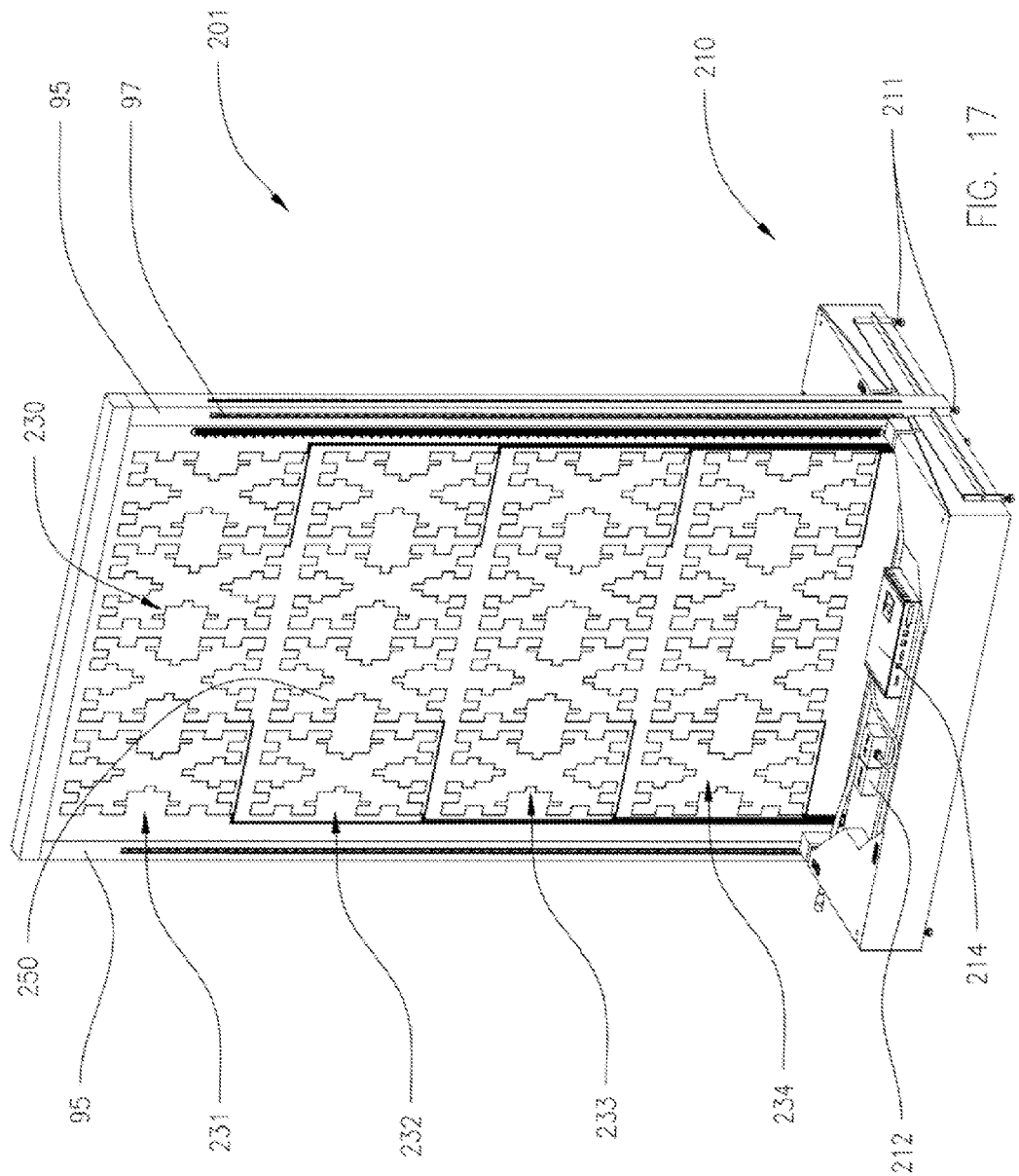

MODULAR RFID SHELVING

BACKGROUND OF THE INVENTION

Grocery shopping was once fairly simple: the customer just requested the necessary item (floor, sugar, eggs) from the shopkeeper who removed it from his supply. There were no multiple brand and size choices, or flavor varieties of the same item. In the 1940's metal grocery store shelving was introduced which dramatically changed the grocery business. Now the business became increasingly self-service, as the shopkeeper became a retailer, losing the personal relationship with the customer.

The retail grocer had to focus on knowing and ordering the products the customers preferred, in the size and configuration they wanted, monitoring the inventory movement to keep fresh inventory arriving and the shelves filled, managing the pricing to take advantage of buying opportunities and keep the customer buying from him rather than from a competitor. Product suppliers increased in numbers and products they offered, as well as developing sophisticated advertising programs to convince shoppers to buy their product at whatever store they shopped. As everything compounded—items inventoried, advertising and promotions, more competing stores, more and different people doing the shopping—management of grocery and consumer product sales has become very challenging. Research has found that store inventory records are generally no better than 65% accurate, out-of-stock items are more than 8 percent, and cost retailer 4 percent of sales. (See Gain inventory visibility and increase sales, http://www.checkpointsystems.com/en/products-services/Merchandise-Visibility.aspx, the disclosure of which is incorporated by reference in its entirety).

A large expense for the retailer (in materials, time/labor, waste generation) is shelf labels. A typical chain retailer makes 10,000 to 12,000 price changes each week, and creating shelf labels to reflect those many changes requires printing paper labels and using staff labor to attach them to the shelves. Mistakes often result during that process, and the number of price changes and shelf-labeling errors are both on the rise. (See, Two Food Chains Trial RFID-based Electronic Shelf Labels, Claire Swedberg, Mar. 30, 2009, http://www.rfidjournal_Altierre.pdf the disclosure of which is incorporated by reference in its entirety).

It is common for the shelf label to be different from the cashier's register price, leading to irritated customers and lost time for price checks. Correct item pricing is critical to the success of the business, both in covering costs and keeping customers.

Consumer product manufacturers and retailers alike depend on advertising to attract customers to their location and to inspire them to purchase their product. Advertising is a huge expense, and as technology develops, more venues open for reaching potential customers. While newspapers, magazines and network TV commercials were once the major advertising media, those venues are being reduced in favor of social media available to customers 24/7. Despite the enormous cost of advertising it is often difficult to measure its effectiveness: how many people actually bought a product because they saw it on a Super Bowl commercial or a high definition video billboard? One caveat seems to be unchallenged: point-of-purchase advertising is the most effective means to generate a customer purchase. "POP is based on shopper behavior. . . . While in a store, a consumer becomes a declared shopper. Relevant buying messages in a store become relevant to a shopper. . . . 70% of purchase decisions are made in-store. . . . 68% of shoppers said in-store messages would sway their product purchasing decisions." (See http://www.slideshare.net/slickchickit/finaldeck, the disclosure of which is incorporated by reference in its entirety).

The problem then is multiple: products must be available and displayed, the inventory must be managed accurately, shelves must have correct item and price labels, and advertising must be appropriately managed to accomplish its purpose. If only there was a way to address each of these issues at once!

Both inventory control and shelf labeling have been addressed for over a decade. Walmart, in 2003 issued an ultimatum that all vendors would provide RFID labeling to individual items, recognizing the high cost of performing manual inventories and the equally high cost of the errors associated with this form of inventory management. Yet, that effort was largely abandoned because of item tagging costs, RFID reading problems associated with metal cans and liquids, particularly when metal cans and water container s(bottles) are stacked together tightly as on a pallet, and the issue of who would bear the cost of providing RFID tags.

While the grocery RFID effort is largely dormant, others have attempted to improve shelf labeling with plastic rewritable tags, ESL's (electronic shelf labels), and other mechanisms attached to existing metal shelves. These have proved cumbersome to the shelving of merchandise, labor and time intensive to monitor and maintain, limited in effectiveness and efficiency to modify shelf item information. To date no real breakthrough in shelf label effectiveness has surfaced; meanwhile mandatory shelf labeling consumes considerable labor and material dollars.

Why has RFID labeling not been welcomed by retail grocers? The first reason is generally, "the tags are too expensive". However, the single largest obstacle to RFID in the grocery environment, the metal shelving on which all inventory is displayed, has been unaddressed. Traditional metal grocery shelving is not compatible with the integration of modern communications technology; the transfer of RFID information has been ineffective in spite of attempts to place strategically located antennas and readers on shelf backs, or aisle ends. These were also inefficient to install and limited the flexibility of shelf relocation.

In regard to the issue of shelf labels, there have been numerous attempts to improve on the constantly replaced paper labels (and their associated waste generation), with longer lasting (sometimes rewritable) plastic labels or with pricing strips to cover an entire shelf front. A shelf labeling system with electronic control, as yet is limited to ESLs, individual battery powered shelf attachments, which have the drawbacks of being cumbersome in the product display area, are easily dislocated from the shelf, require monitoring and battery maintenance by store staff, and are not very eye-catching. As cited by Bonner (US 2013/0176398 A1), ". . . such displays are expensive and susceptible to damage leading to failure of the display. Moreover, such displays may require independent power supplies which make readjusting the spacing between vertically and horizontally adjacent shelves a difficult task as the power supplies have to be independently rerouted. Accordingly a need exists for alternative display shelf modules for displaying product information and modular shelving systems incorporating the same."

Finally, both suppliers and retailers constantly attempt to perfect point-of-purchase advertising. An overview of any grocery may reveal floor decals in front of a manufacturer's products, hanging signs and banners, automatic coupon dispensers, battery powered talking videos, temporary focused product displays (with seasonal or item specific focus), signs on shopping carts, store fronts and parking lot cart carrels. The impact is generally confusing, messy, and overwhelming to the customer and he responds by attempting to block it all out. Retailers complain about their stores being taken over by the clutter of manufacturers' advertising. Manufacturers complain that retailers often place the advertising provided in a location remote from the inventory items being promoted— reducing the sales effectiveness of the investment.

Similar to ESLs are units that attach to existing metal shelves used to provide POP advertising. Currently these are videos played on a DVD player which cycles the message on a set play schedule. This limits the manufacturer's and/or retailer's ability to modify or start a unique point in time advertisement to take advantage of unscheduled or unforeseen events. To date there is nothing which allows network provided advertising via broadband or alternative means directly to the shelf where purchase decisions are being made.

SUMMARY OF THE INVENTION

An aspect of the present invention is a modular composite smart shelf, useful as a retail shelf for reading real-time inventory of retail goods displayed thereon, comprising: a) a non-metallic low density core having opposed top and bottom laces, and an outer perimeter including as rear edge, a front edge; and opposed side edges; b) a molded frame secured along the outer perimeter of the core, including: i) an elongated rear molded frame member affixed to the rear edge of the core, having a top surface and a cavity with a rear-facing opening along the length; ii) an elongated front molded frame member affixed to the front edge of the core, having a top surface and configured for mounting of a separate video display panel along the front edge of the shelf; and iii) opposed side molded frame members connecting the rear molded member to the front molded member, each side molded member having a top surface, a rear end, is front end, an underside; c) a thermoplastic or resinous sheet including a top sheet secured to the top face and a bottom sheet secured to the bottom face of the core, including a plurality of antennae embedded within at least one of the top sheet and the bottom sheet; d) an RF or other electronic transceiver in electrical communication with the plurality of antennae, secured within the cavity of the rear molded member; and e) a power and communications connector secured within the cavity of the rear molded member, and connected in electronic communication with the RF or other transceiver, and with the front video display panel.

A further aspect of the present invention is a modular composite smart shelf, useful as a retail shelf for reading real-time inventory of retail goods displayed thereon, comprising: a) a non-metallic low density core having opposed top and bottom faces, and a continuous outer perimeter including a rear edge, a front edge, and opposed side edges; b) a molded frame secured along the outer perimeter of the core, including: i) an elongated rear molded frame member affixed to the rear edge of the core, having a top surface and a cavity with a rear-facing opening along the length; ii) an elongated front molded frame member affixed to the front edge of the core, having a top surface and configured for mounting of a video display panel along the front edge of the shelf; and iii) opposed side molded frame members connecting the rear molded member to the front molded member, each side molded member having a top surface, a rear end, a front end an underside, and an overhanging edge defining an undercut, wherein at least one of the opposed side molded members has a channel extending from the rear end to the front end; c) a thermoplastic or resinous sheet secured to each of the top face and the bottom face of the core, including a plurality of antennae embedded within at least one of the top sheet and the bottom sheet; d) an RF transceiver in electrical communication with the plurality of antennae, secured within the cavity of the rear molded member; and e) an electronic microprocessor secured within the cavity of the rear molded member, and connected in electronic communication with the RF transmitter and with the front video display panel.

In yet another aspect of the invention, the non-metallic core comprises a honeycomb -core made of a thermoplastic.

In a further aspect of the invention, the thermoplastic or resinous top sheet covers at least a portion of the top surface of the molded frame.

In a further aspect of the invention, the antennae is a fractal (or comparable) antennae.

In a further aspect of the invention, the one or more antennae has a connection lead disposed in or extending from a peripheral edge of the sheet.

In another aspect of the invention, the thermoplastic or resinous sheet comprises a composite material comprising a thermoplastic resin and a reinforcing filler material.

In a further aspect of the invention, the smart shelf further includes a closure covering a portion of the rear-facing opening of the rear molded frame member. The closure can be transparent, such as a transparent thermoplastic material.

In at further aspect of the invention, the smart shelf further includes a power and communications connector secured within the cavity of the rear molded frame member, and including a plurality of connector blades that extend rearwardly through the rear-facing opening, configured to engage a power and signal receptacle in an upright support member of a shelving structure. The closure covering the rear-facing opening of the rear molded frame member has an opening through which the connector blades extend. A hatch covering covers the opening and includes slot openings to accommodate extensions of the connector blades.

In another aspect of the invention, the smart shelf further includes a pair of support brackets, each support bracket configured to attach to one of the opposed side molded frame members, each support bracket including a horizontal ledge for supporting the underside of the side molded frame member, an upper edge for supporting the shoulder in the side molded member, and a means for removably attaching the smart shelf to an upright support member of a shelving structure.

In a further aspect of the invention, the molded frame comprises an extruded thermoplastic. The molded frame can also comprise a composite material comprising a thermoplastic resin and a reinforcing filler material.

In another aspect of the invention, the smart shelf further includes a front video display panel mounted to the front molded frame member.

In another aspect of the invention, the rear molded frame member contains one or more electronic components for communication with or between the microprocessor, the RF transmitter, the front video display panel, and with an electronic device in the shelving structure.

BRIEF DESCRIPTION OF THE FIGURES

FIG. 17 shows a perspective view of the shelf gondola including a pair of upright support structures, a support base, and a vertical wall including RF antennae.

DETAILED DESCRIPTION OF THE INVENTION

Figure 1:
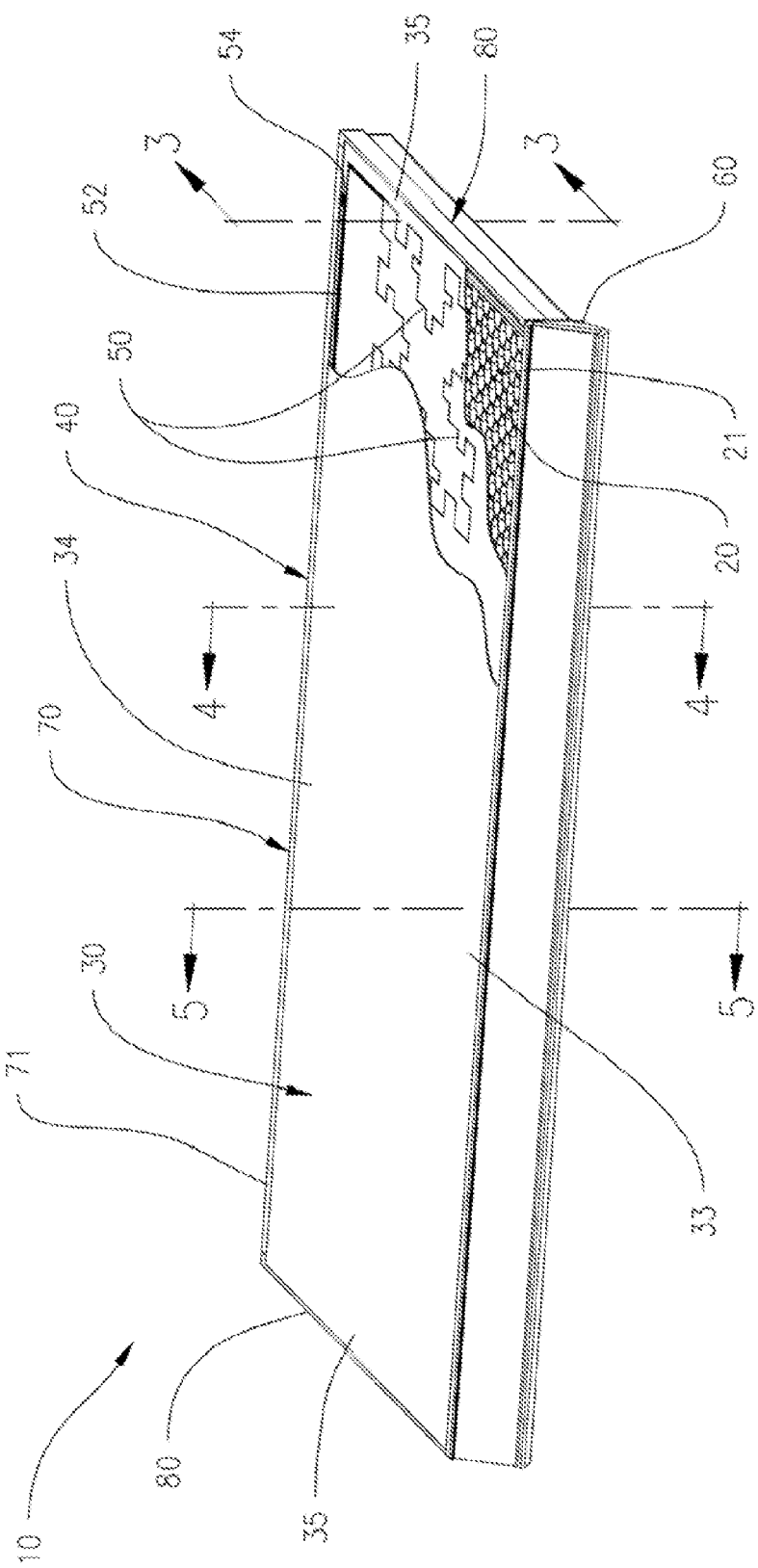
FIG. 1 shows a top-front perspective view of a smart shelf of the present invention, including a core structure, perimeter frame, and a top sheet and a bottom sheet with antennae.
Figure 2:
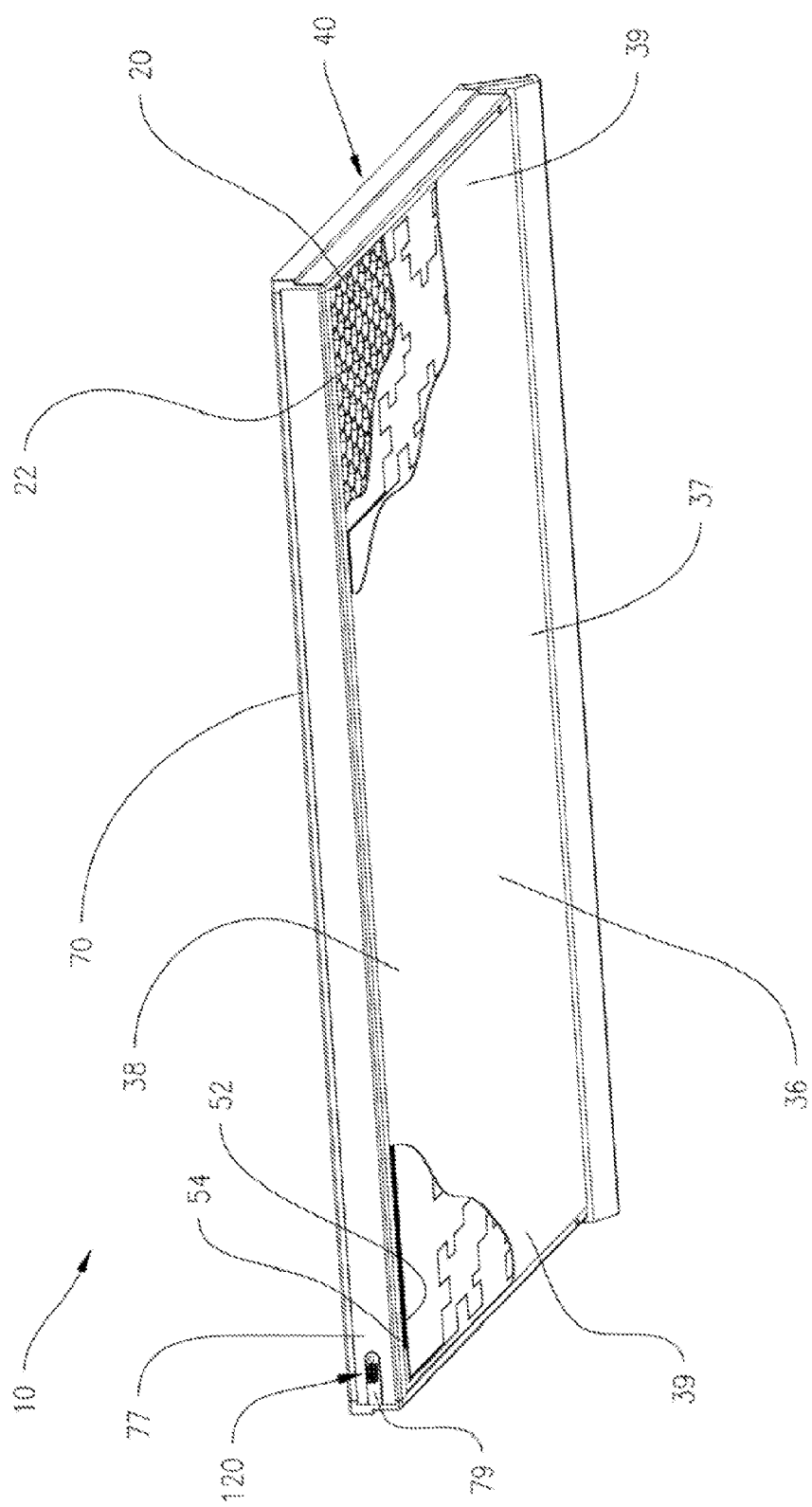
FIG. 2 shows a bottom-rear perspective view of the smart shelf.

This technology suggests that perhaps the "recalcitrant" variable in retail grocery is the metal shelving. This invention provides an avenue to address several issues simultaneously; however, it would require re-engineering of the shelving platform, including structure, materials, and manufacturing process and culture. This redesign of retail shelving using plastics and composite engineering enables grocers to eliminate the costs and inefficiencies of shelf labeling, offer a premier location for "point-of-purchase" advertising, and to benefit from electronic inventory management systems as they become increasingly available and affordable. Electronic inventory management systems includes RFID systems and long wave (LW) magnetic signals, (also known as RuBee, IEEE standard 1902.1).

A smart shelf of the present invention provides an integral component of a retail grocery shelving system. Each shelf described is nominally the same, though can differ in shelf depth and/or width. The shelf is described as "modular", in that, given an appropriate width shelving structure (commonly referred to as a gondola), shelves can be removed from one location on the gondola and installed in another location, or can be removed from a location on one gondola and installed in a location on another gondola, and be instantly functional. The shelf is described as "self-contained" or "plug and play", in that there are no extra parts, wires, cables or connections required for the shelf to function when placed into an installed position of an appropriate gondola. The shelf functions as a modular element in a telecommunications center, regardless of its position or the items stored thereupon. The shelf is constructed to avoid any interference with identifying, counting and transmitting information about individual items displayed thereon, and shelves throughout the store communicate to store management and product manufacturers how much inventory of any item is in the store at any given time, where each item is located, and to enable updating the real-time inventory when an item is sold. The shelf further provides customer information on the video panel shelf front, accommodating both HD video advertising and multi-faceted (rotating data screen) shelf item labels. The shelf can also communicate with the customer via smart phone providing location information within the store, product information via QR codes, and relevant customer offers pending items viewed or selected.

A smart shelf can read and transmit RFID (electronic) item information via authorized computer access to store or chain management, to consumer product manufacturers, and (where software design allows) to a customer, for example, via smart phone. The smart shelf is relatively light weight for its strength and contains within its structure all the electronic devices and connections to enable an authorized computer operator to view all the inventory (along with additional information contained on the RFID tag, i.e. date of manufacture, production lot, recall information) on a given shelf at a given time, including locating items which are mislaid from their appropriate display area. The computer operator can "ping" for a given location, identifying what is on a given shell or "ping" for a unique item number, thus locating mislaid items.

Traditional shelving has been constructed of metal, including steel and stainless steel, for rigidity and strength. In many demanding applications where metals have traditionally been used, including aircraft and automobile manufacturer where weight to strength ratios and manufacturability (among other factors) are key issues, the sophistication of plastics is ever increasing, filling roles previously owned exclusively by metals. Importantly, in the context of RFID tagging and reading, metals are impossible for radio signals to penetrate, while plastics are transparent to RFID transmission.

As shown in FIG. 1-5, each shelf 10 includes a core structure 20, typically in a planar, rectangular shape, is top sheet 30 and bottom sheet 36, and a surrounding perimeter frame 40.

The core structure 20 can include a non-metallic, low-density core structure having opposed top face 21 and bottom face 22, and a continuous outer perimeter including a rear edge 24, a front edge 23; and opposed side edges 25. The low-density core structure 20 has a low basis weight, while having a robust mechanical structure having structural durability (including compression and tensile strength), to maintain a rigid, planar shape under ordinary weight -bearing conditions. The core structure 20 can be a foamed material, comprising air or gas pockets throughout the structure, or can be a constructed structure made of plastic (including polymers), metallic, cellulosic (including paper and wood), carbonaceous, or inorganic materials. An example of a constructed structure is a honeycomb core. A typical embodiment of a smart shelf includes a thermoplastic honeycomb core, as described in U.S. Pat. No. 5,683,782 (Duchene, 1997). Typical dimensions of the core structure are about 12 inches to 72 inches (30-180 cm) in width, 8 inches to 36 inches (20-90 cm) in shelf depth, and ½ inch to 6 inches (1-15 cm) in thickness, with a honeycomb cell opening size of from about 0.1 inch to about 1 inch (3 to 25 mm).

The shelf also includes a thermoplastic or resinous sheet, including is top sheet 30 secured to the top face 21 of the core structure 20, and a bottom sheet 36 secured to the bottom face 22 of the core structure 20, to cover substantially the entire top and bottom surfaces. The sheets 30,36 have a thickness of about 1/16 to 3/4 inches (1-20 mm), and has a thickness sufficient to provide a firm, flat and even surface to the shelf. The sheets 30,36 can comprise a single distinct layer or a laminate of two layers, for example inner layer 30a and outer layer 30b, or more. The material of the thermoplastic or resinous sheet can be selected from the group consisting acrylonitrile butadiene styrene (ABS), polyethylene terephthalate (PET), cellular acetate, ethylene-vinyl acetate, acrylic, epoxy resins, nylon, polyethylene (PE) including high density polyethylene (HDPE) and linear low density polyethylene (LLDPE), polypropylene (PP), polystyrene, polytetrafluoroethylene (PTFE), vinyl, polyvinyl chloride (PVC), polycarbonate, and polyurethane, and laminates and blends thereof. The thermoplastic or resinous sheet 30,36 can include a composite material comprising a thermoplastic resin and a reinforcing filler material. The sheet can be formed by any well-known process for making sheet pieces or rolls of a sheet.

The top sheet 30 or the bottom sheet 36, or both, can include one or a plurality of antennae 50 embedded on or within the thermoplastic or resinous material of the sheets 30 and 36, and typically below an outer-facing surface 31 of the thermoplastic or resinous material of the sheets 30 and 36. In the illustrated embodiment, eight antennae per shelf unit are used. The number of antennae can be any integer from two to sixteen, including four to twelve and six to ten. The antenna 50 can be laminated within the sheet by various means; for example, as disclosed in U.S. Pat. No. 7,209,039 and US 2004-0224135 Krebs, the disclosures of which are incorporated by reference in their entireties. The antennae 50 include RFID antennae, and preferably fractal antennae (e.g. Fractal Antenna Systems, http://www.fractenna.com/index.hmtl), arranged in a matrix pattern. The antennae 50 can be built, inserted or formed into the sheets 30,36 during extrusion of the sheets. Each antennae 50 connects through a lead 52 to a connection end 54 disposed in or extending from a peripheral edge of the sheet (typically the rear edge 34, 38 of the sheets 30,36, as shown in FIG. 1), where an electronic contact and interface is made with the plurality of RF transceivers 110. These antennae 50, which may not be visible and are protected from contact within the top and bottom sheets 30,36, enable reading RF and other electronic data on inventory items displayed on the shelf 10, and transmitting the data through the RF or other electronic transceivers (pending tag or ID type encoding) in the rear molded frame member of the shelf, described below.

The surrounding perimeter frame 40 is typically a molded frame and includes a. molded plastic frame. The molded frame 40 is secured along the outer perimeter of the core structure 20. The molded frame 40 includes a front molded frame 60, a rear molded frame member 70, and opposed side molded frame members 80 that connect the rear molded frame member 70 to the front molded member 60 at opposite ends. The molded plastic frame members can include an extruded thermoplastic frame member. The material of the molded plastic frame members can include a thermoplastic material. The material of the molded plastic frame members can also include a composite material comprising a thermoplastic resin and a reinforcing filler material.

The rear molded frame member 70 (FIG. 4) is an elongated structure extending along and affixed to the rear edge 24 of the core structure 20. The rear molded frame member 70 has a top surface 71, a forward wall 72 has a forward-facing attaching surface that confronts and secures to the rear edge 24 of the core structure 20. The height of the attaching surface of the forward wall 72 can be the same as the thickness of the core structure 20, and the width of the attaching surface 72 can be the same as the length of the rear edge of the core structure 20. The rear molded frame member 70 has a cavity 73 defined at least by the forward wall 72 and the top surface 71, with a rear-facing opening 75 along the rear length. The rear molded frame member 70 can also include a rear-facing surface 74 and a bottom surface 76, to farther enclose the cavity 73, with the rear-facing opening 75 disposed in the rear-facing surface 74.

The rear molded frame member 70 can also include a closure 77 that covers the rear -facing opening 75 in the rear molded frame member 70. The closure 77 can be configured for sliding river and away from the opening 75. The closure 77 can be configured with a hinge for pivoting over and away from the opening. The closure can be transparent, and can include, without limitation, a polycarbonate material, a glass material and an acrylic material. The transparent closure 77 protects the electronics within the cavity 73 while allowing accessibility to the electronic components within the rear molded frame member 70, far upgrades, maintenance, repairs, etc.

The front molded frame member 60 (FIG. 5) is an elongated structure extending along and affixed to the front edge 23 of the core structure 20. The from molded frame member 60 has a rearward-facing attaching surface 62 that confronts and secures to the front edge 23 of the core structure 20. The height of the attaching surface 62 can be the same as the thickness of the core structure 20, and the width of the attaching surface 62 can be the same as the length of the front edge of the core structure 20. The front molded frame member 60 has a top surface 61, a bottom surface 66, and a forward-facing interface 64 for mounting of a video display panel 101 along the front edge of the shelf 10.

The front molded frame member 60 includes a forward-facing cavity 63, a pair of opposed slots 68 or other means to hold a clear, transparent protective panel 67. The front molded frame member 60 can house the video screen 101 and protective cover 67. The video screen 101 including a monitor for displaying both shelf item labels and high definition video advertising. In another embodiment, the front molded frame member 60 can contain or retain a wireless transceiver (not shown) to effect communication between a shopper's "i-device" or intelligent device which would include a mobile, cellular or network phone (such as the I-phone™), tablet or pads (such as the I-pad™), or other devices ((such as the I-watch™ and the I-pod™), or an equipped shopping cart, and the wireless transceiver.

Each opposed side molded frame member 80 (FIG. 3) has a rear end and a front end, a top surface 81, an underside surface 86, an overhanging shoulder 84 defining an undercut 89, and a laterally-facing attaching surface 82 that confronts and secures to the each of the opposed side edge 25 of the core structure 20. The height of the attaching surface 82 can be the same as the thickness of the core structure 20, and the width of the attaching surface 82, from the rear end to the front end, can be the same as the width of the side edge of the core structure 20.

One or the other, or both, side molded members 80 has a channel 83 that extends from the rear end to the front end. The channel 83 provides a pathway for extending a wire or cable 102 from the rear of the shelf 10 to the front of the shelf. The channel 83 can be a bore or a slot or groove along the length of the side molded frame member 80. The size or depth of the channel 83 is sufficient for inserting a communication cable or wiring. The channel 83 can be accessed after the side molded members 80 are secured to the side edges 25 of the core structure 20. In an aspect of the invention, the channel 83 is formed into the upper surface 81, for insertion of the communication cable or wiring 102 down through an opening 8S into the channel 83. After the communication cable or wiring 102 is inserted, the opening 88 into the channel 83 can be covered or sealed with a sealant, plug or other covering.

Figure 4:
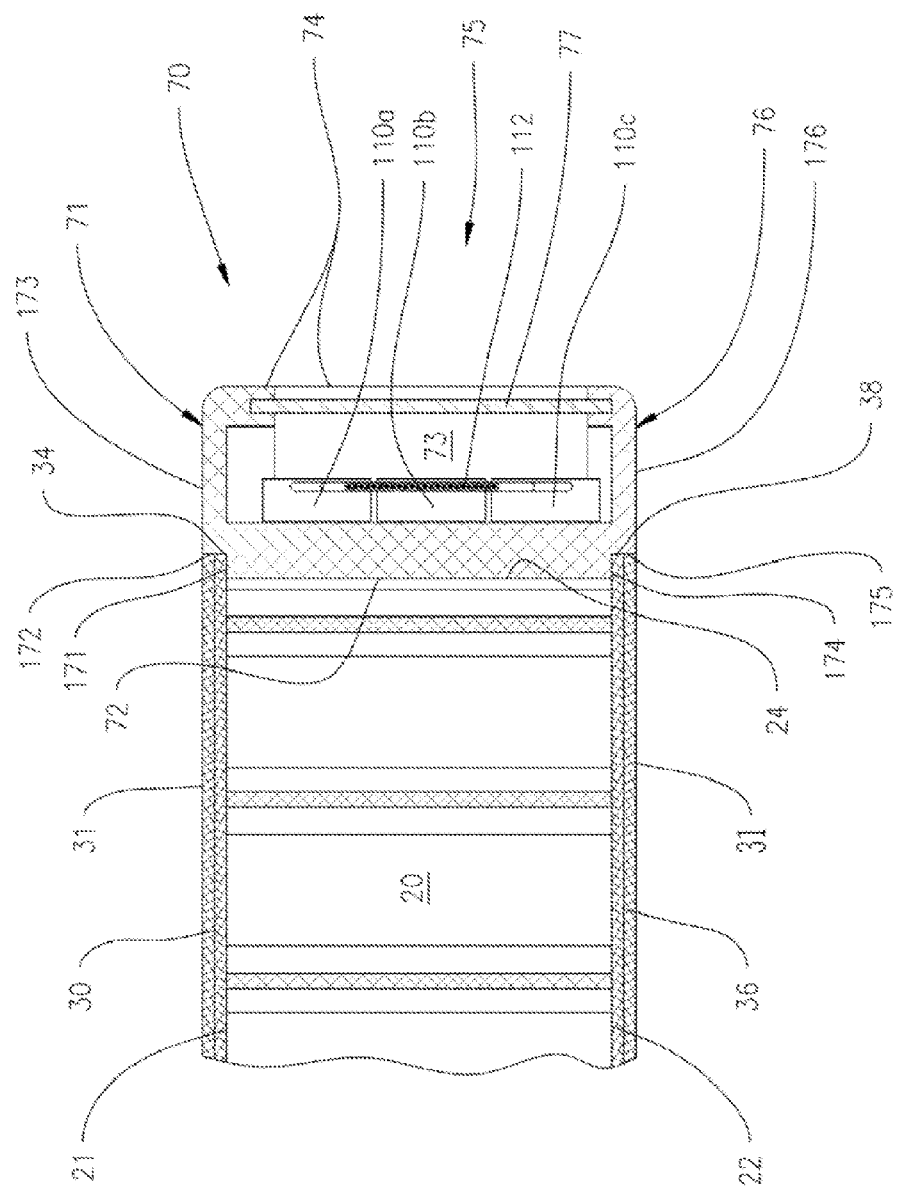
FIG. 4 shows an elevation section view of the rear edge of the smart shelf, along line 4-4 of FIG.1.
Figure 5:
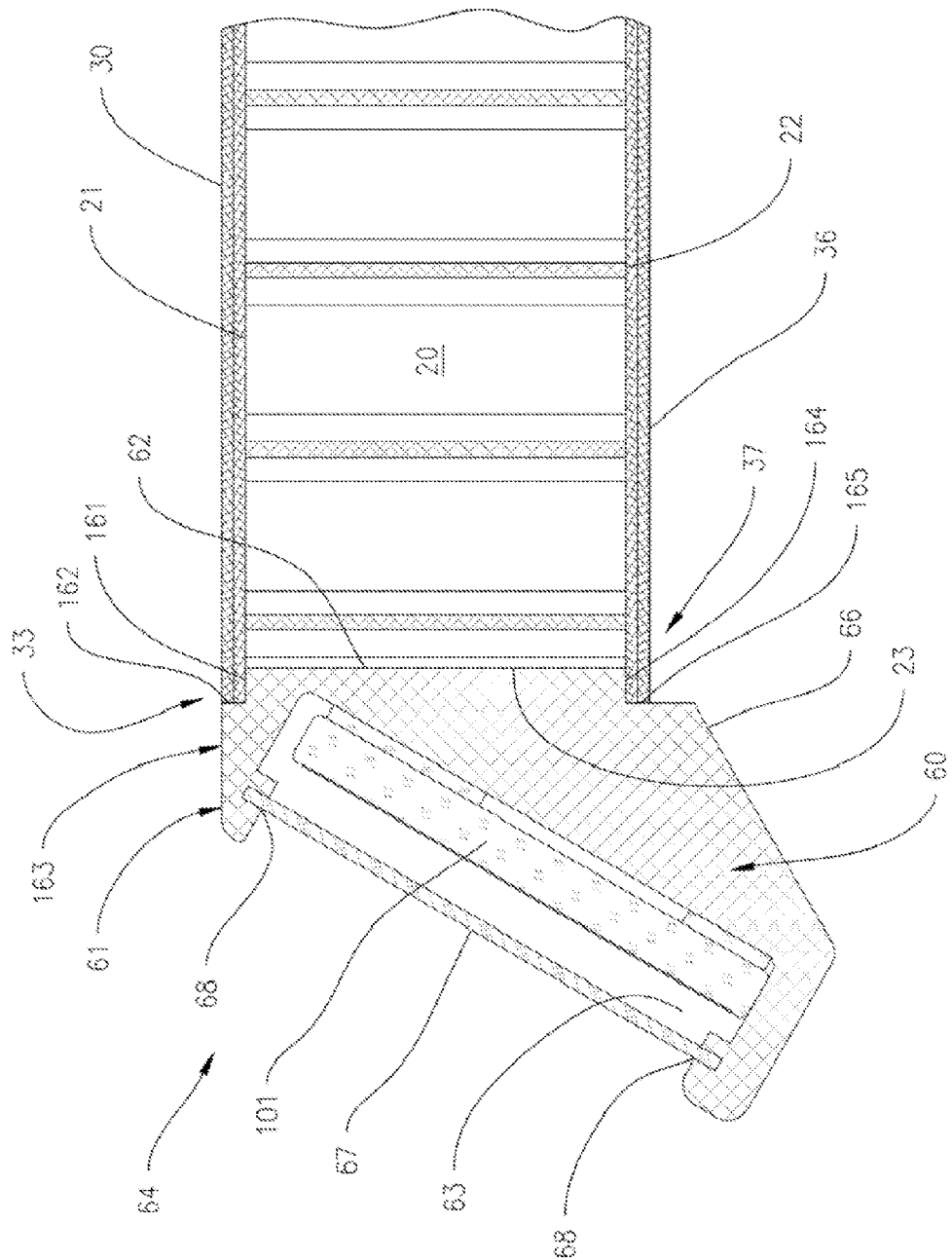
FIG. 5 shows an elevation section view of the front edge of the smart shelf, along line 5-5 of FIG. 1.

The perimeter edges of the top sheet 30 and bottom sheet 36 can extend over a portion of the top and bottom edges, respectively, of the peripheral frame members. As shown in FIG. 4, the top surface 71 of the rear molded frame member 70 can have an upper landing surface 171, a riser surface 172 extending up from the landing surface 171, in a step fashion, to an upper step surface 173, to receive and secure the rear peripheral edge 34 of the top sheet 30 to the rear molded frame member 70. The rear molded frame member 70 is configured to secure to the rear edge 24 of the core structure so that the upper surface 21 of the core structure 20 is flush with the upper landing surface 171, with the rear, peripheral edge 34 of the thermoplastic or resinous sheet 30 extending over the upper landing surface 171 of the rear molded frame member 70. The riser surface 172 is configured in height dimension to the thickness of the thermoplastic or resinous sheet 30, so that the upper surface 31 of the rear peripheral edge 34 of the top sheet 30 is also flush with the upper step surface 173 of the rear molded frame member 70. The under surface of the rear peripheral edge 34 of the top sheet 30 is secured to the upper landing surface 171 of the rear molded frame member 70 to improve the strength and integrity of the shelf unit, while the upper surface 31 of the top sheet 30 extends at a seam to the upper step surface 173 of the rear molded frame member 70.

Likewise, the bottom surface 76 of the rear molded frame member 70 can have a lower landing surface 174, a riser surface 175 extending down from the lower landing surface 174, in a step fashion, to a lower step surface 176. The lower surface 36 of the rear edge 24 of the core structure 20 is flush with the lower landing surface 174, so that the rear edge 38 of the bottom sheet 36 extends over the lower landing surface 174 of the rear molded frame member 70. The lower riser surface 175 is likewise configured in dimension to the thickness of the bottom sheet 36, so that the rear surface 31 of the rear edge 38 of the bottom sheet 36 is also flush with the lower step surface 176 of the rear molded frame member 70. The upper surface of the rear edge 38 of the bottom sheet 36 is secured to the lower landing surface 174 of the rear molded frame member 70 to improve the strength and integrity of the shelf unit.

Figure 3:
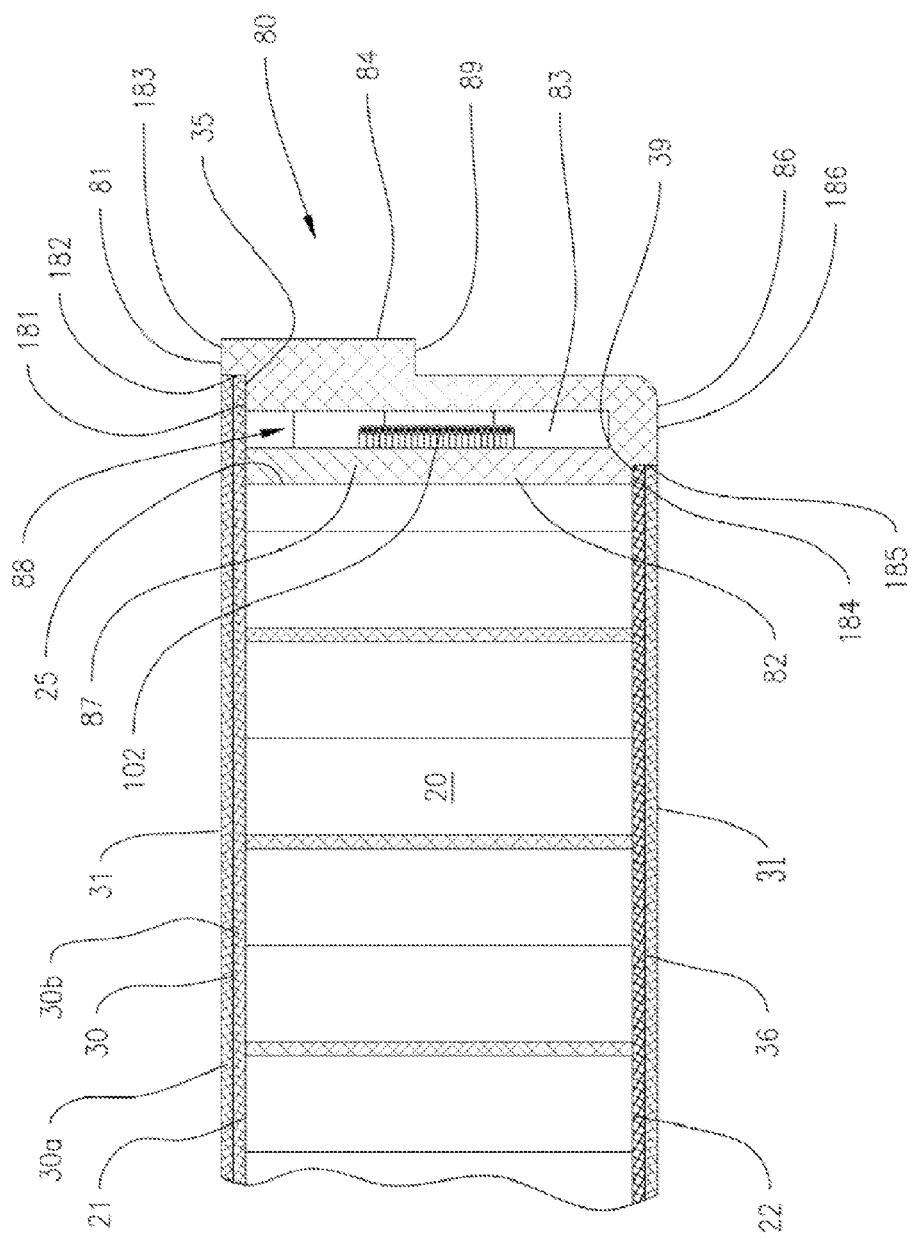
FIG. 3 shows an elevation section view of the side edge of the smart shelf, along line 3-3 of FIG. 1.

Similarly, the top surface 61 and bottom surface 66 of the front molded frame member 64 (FIG. 5) has an upper landing surface 161, a riser surface 162, and an upper step surface 163, to receive and secure the front peripheral edge 33 of the top sheet 30, and a lower landing surface 164 and a riser surface 165, to receive and secure the front peripheral edge 37 of the bottom sheet 36. Likewise, as shown in FIG. 3, the top surface 81 of the opposed side molded frame members 80 has an upper landing surface 181, as riser surface 182, and an upper step surface 183, to receive and secure the side peripheral edge(s) 35 of the top sheet 30, and the bottom surface 86 has a lower landing surface 184, a riser surface 185, and a lower step surface 186, to receive and secure the side peripheral edge 39 of the bottom sheet 36.

The securing of the peripheral edges of the top sheet 30 and bottom sheet 36 to the landing surfaces of the molded frame 40 and to the upper surface 21 and lower surface 22 of the core structure 20, in combination with the securement of the molded frame 40 to the peripheral edges of the core structure 20, improve the strength and integrity of the shelf unit 10. The top sheet 30 and bottom sheet 36 are secured to the molded frame 40 using an adhesive or thermal bonding. A non Limiting example of an adhesive is a methacrylate. Thermal bonding can be provided by ultrasonic welding, infrared welding, and RF welding.

In the side molded frame members 80, the channel 83 can be formed into the upper surface 81, down and parallel with the inner wall 87. The construction of the smart shelf permits the installation of the communication cable or wiring 102 into the channel 83, prior to applying the top sheet 30 to the core structure 20. The applied top sheet 30 covers and seals the space within the channel 83 from outside elements, including spills and cleaning solutions. The channel 83 can be formed into the molded frame member 80 when molded or extruded, or can be formed into the molded or extruded frame member 80 using standard machining techniques. The channel 83 can extend a small portion or a substantial portion of the height of the side frame member 80.

Figure 6:
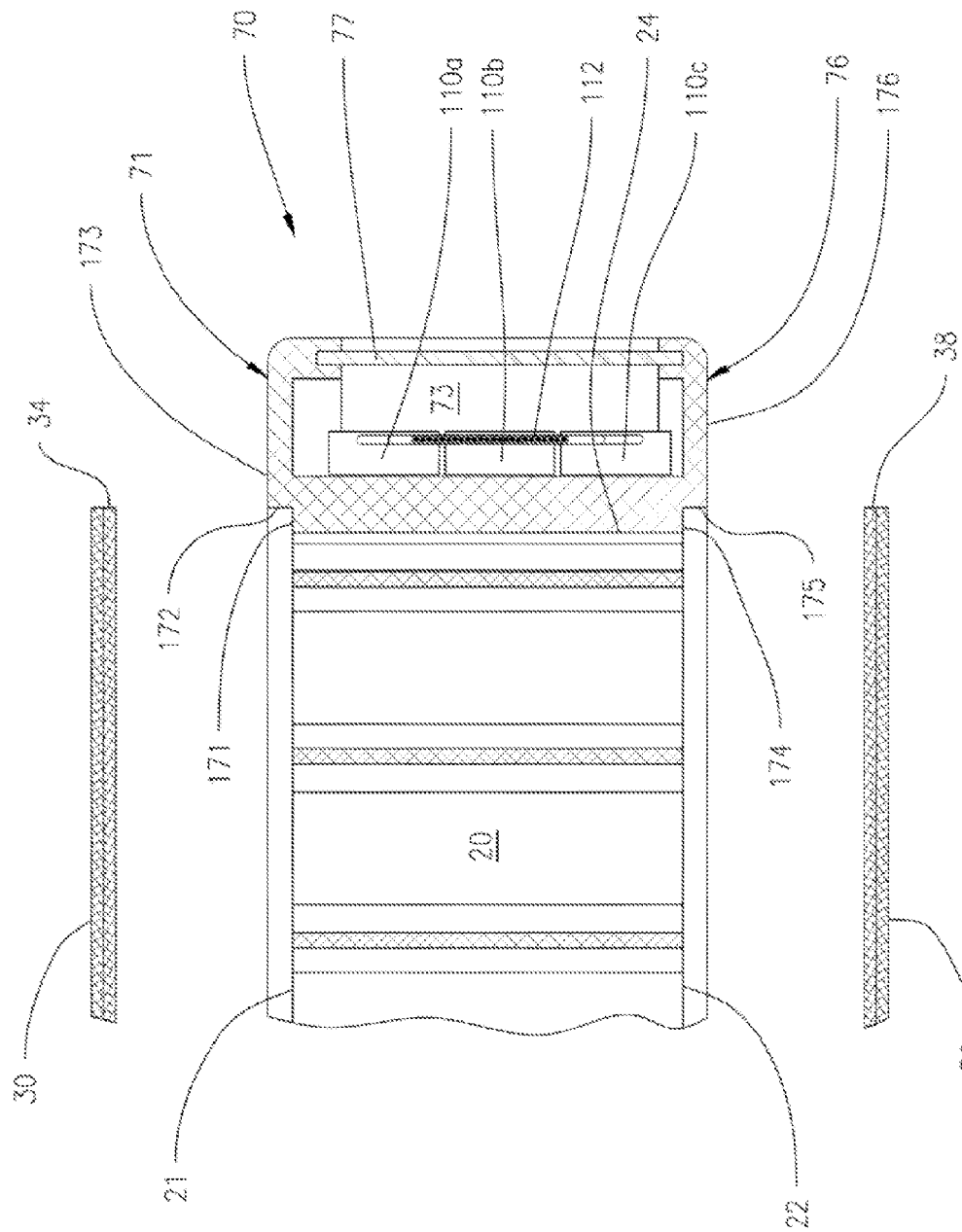
FIG. 6 shows the view of FIG. 4 with the top sheet and bottom sheet moved away from the core structure of the smart shelf.
Figure 7:
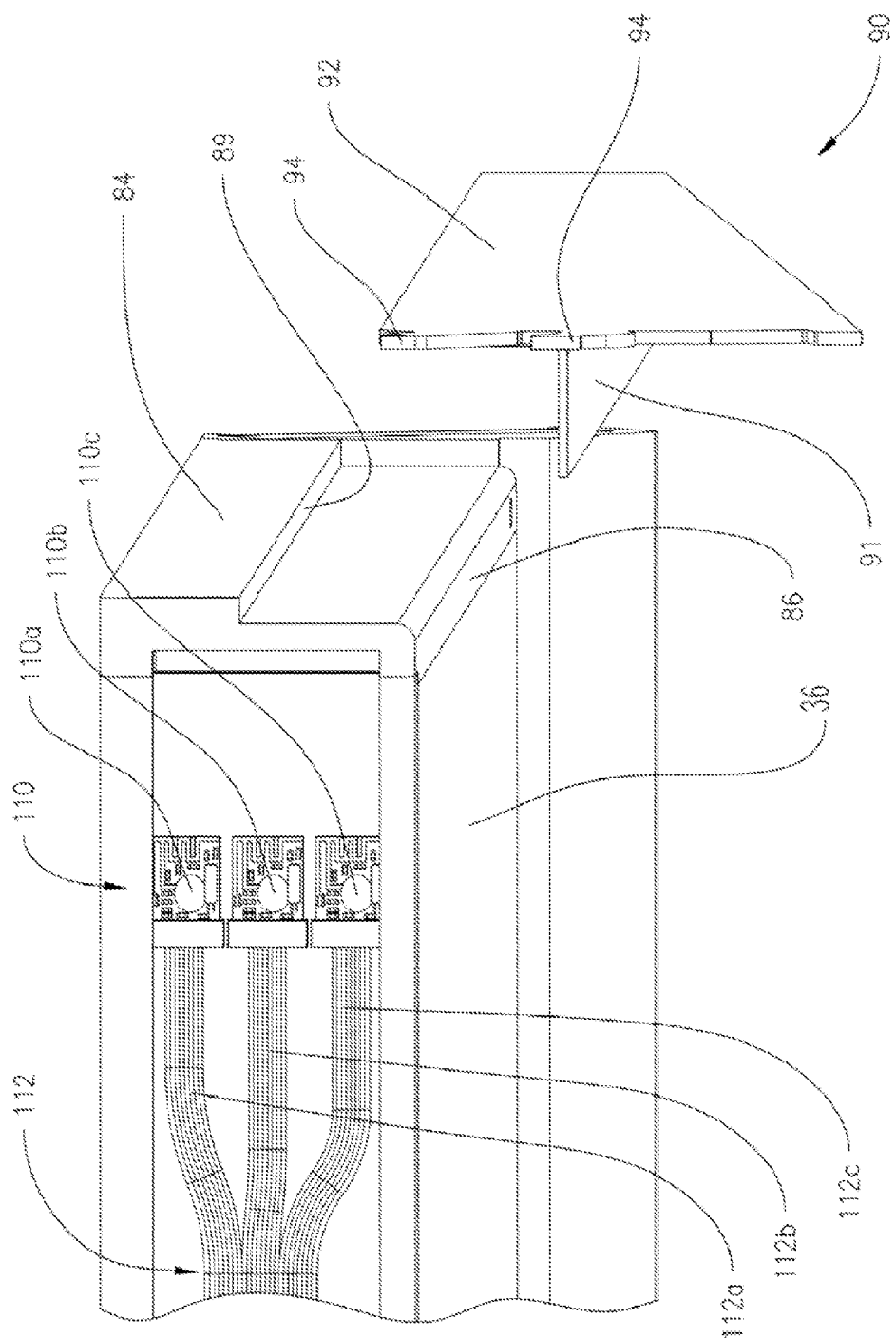
FIG. 7 shows a bottom-rear perspective view of the side edge of the smart shelf with a separated support bracket.

The smart shelf provides electronic components that provide the modular shelf with RFID or other electronic reading and electronic information communication with a local area network. The shelf includes one or more RF transceivers (transmitter/receivers) 110 (FIGS. 4, 6 and 7) secured within the cavity 73 of the rear molded member 70. The RF transceivers 110 are secured within the cavity 73 by any well-known means, including with adhesive, fasteners, and other mechanical securements, including but not limited to tabs in slots, etc. Each RF transceiver 110 is in electrical communication with a plurality of connection ends 54 of the plurality of antennae(s) 50, as described below. A first RF transceiver 110*a* is connected to the leads for the eight antennae 50 disposed in the top sheet 30, communicating the information from the antennae on and above the top surface of the shelf, and a second RF transceiver 110*b* is connected to the leads for the eight antennae 50 disposed in the bottom sheet 36, communicating the information from the antennae below the bottom surface of the shelf. A third RF transceiver 110*e* can be a spare.

Figure 8:
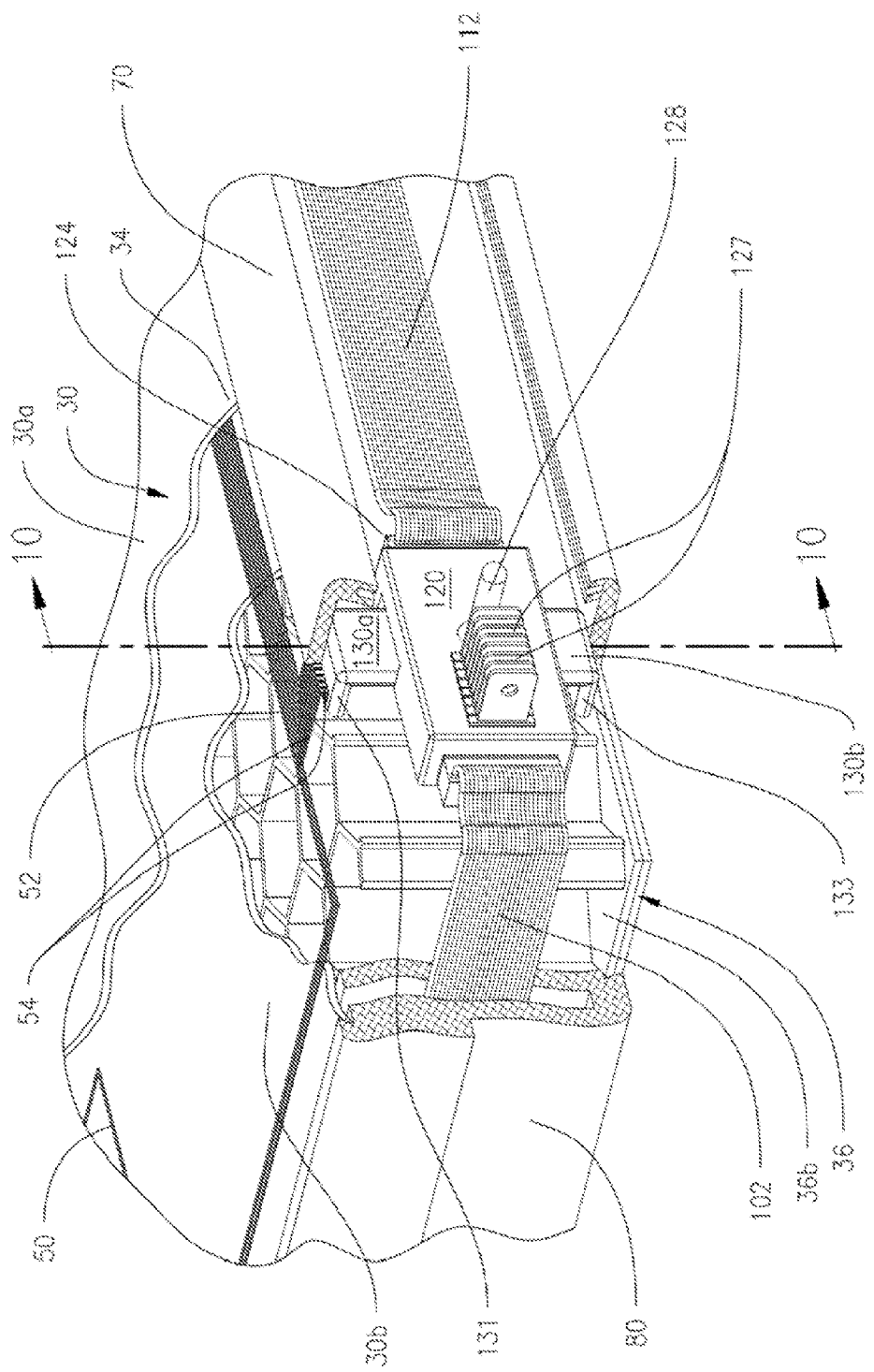
FIG. 8 shows a top, rear perspective view of the smart shelf with partial cut-away of the top sheet, rear molded frame member, and side molded frame member, showing the antennae, antennae connectors, and a power and communications connector.
Figure 9:
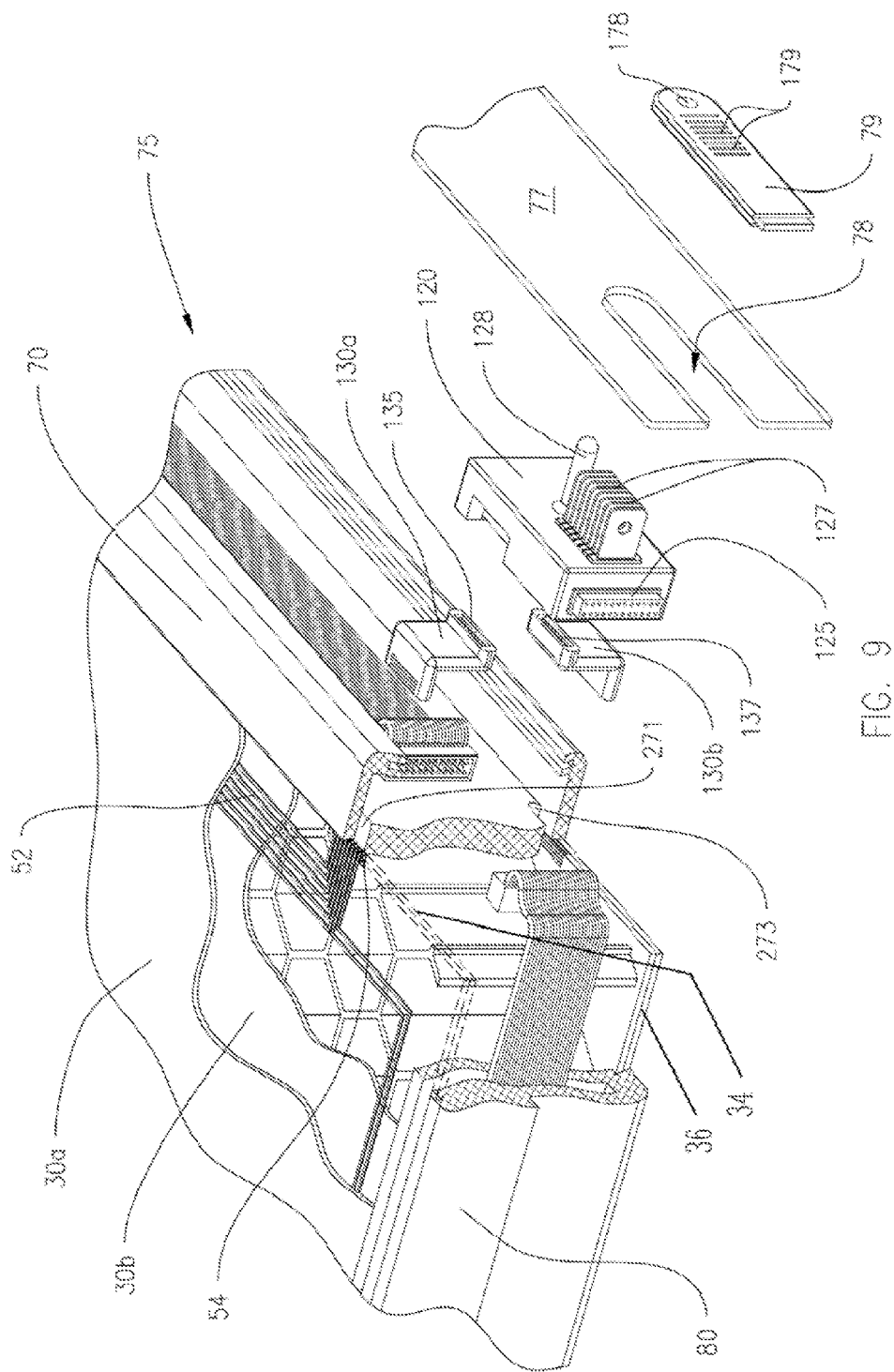
FIG. 9 shows the smart shelf of FIG. 8 with a rear cover panel over the opening of the rear molded frame member, with the rear cover panel and the power and communications connector pulled away from the rear molded frame member.
Figure 10:
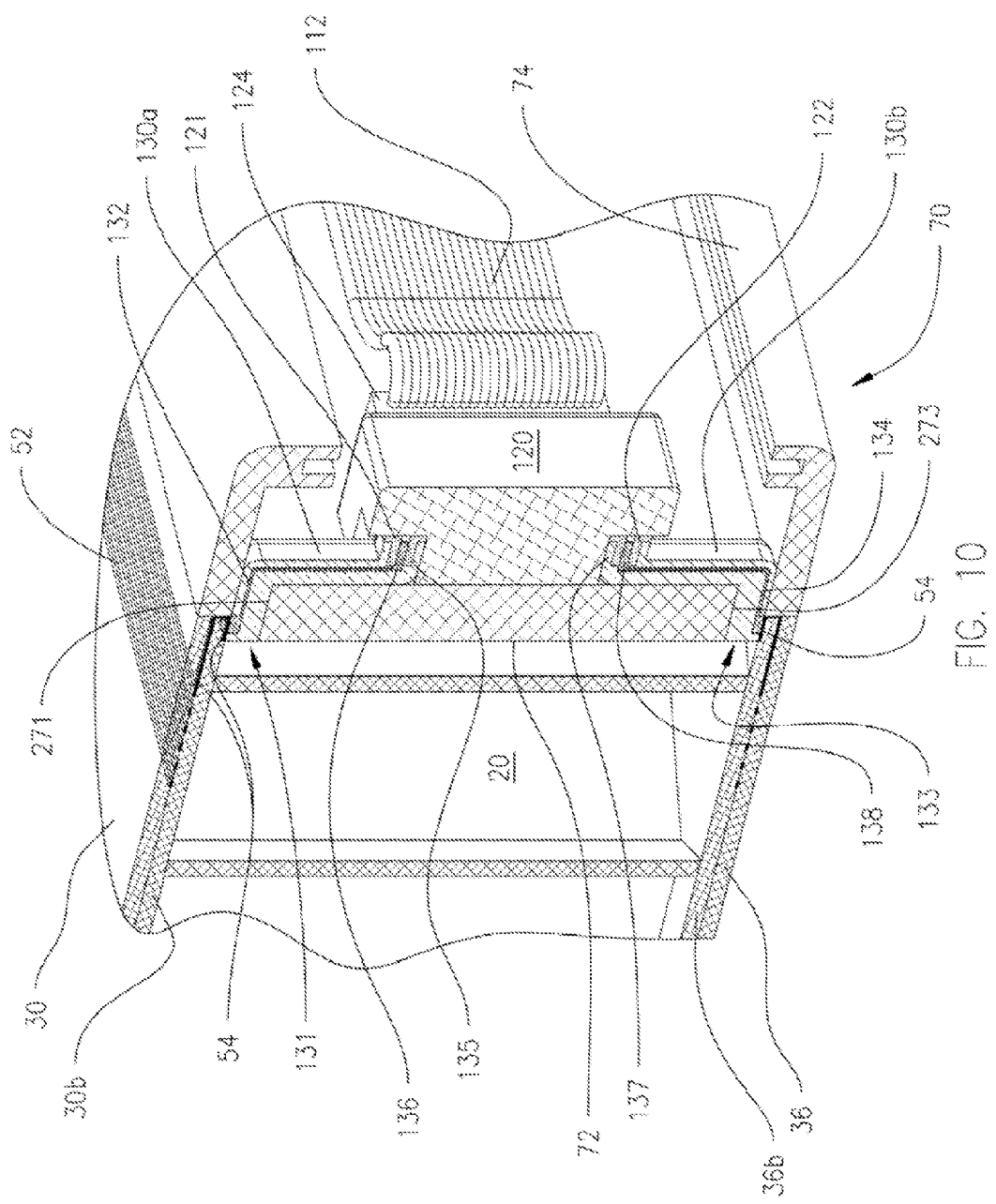
FIG. 10 shows an elevation section view through the antennae connectors and power and communications connector, along line 10-10 of FIG. 8.
Figure 11:
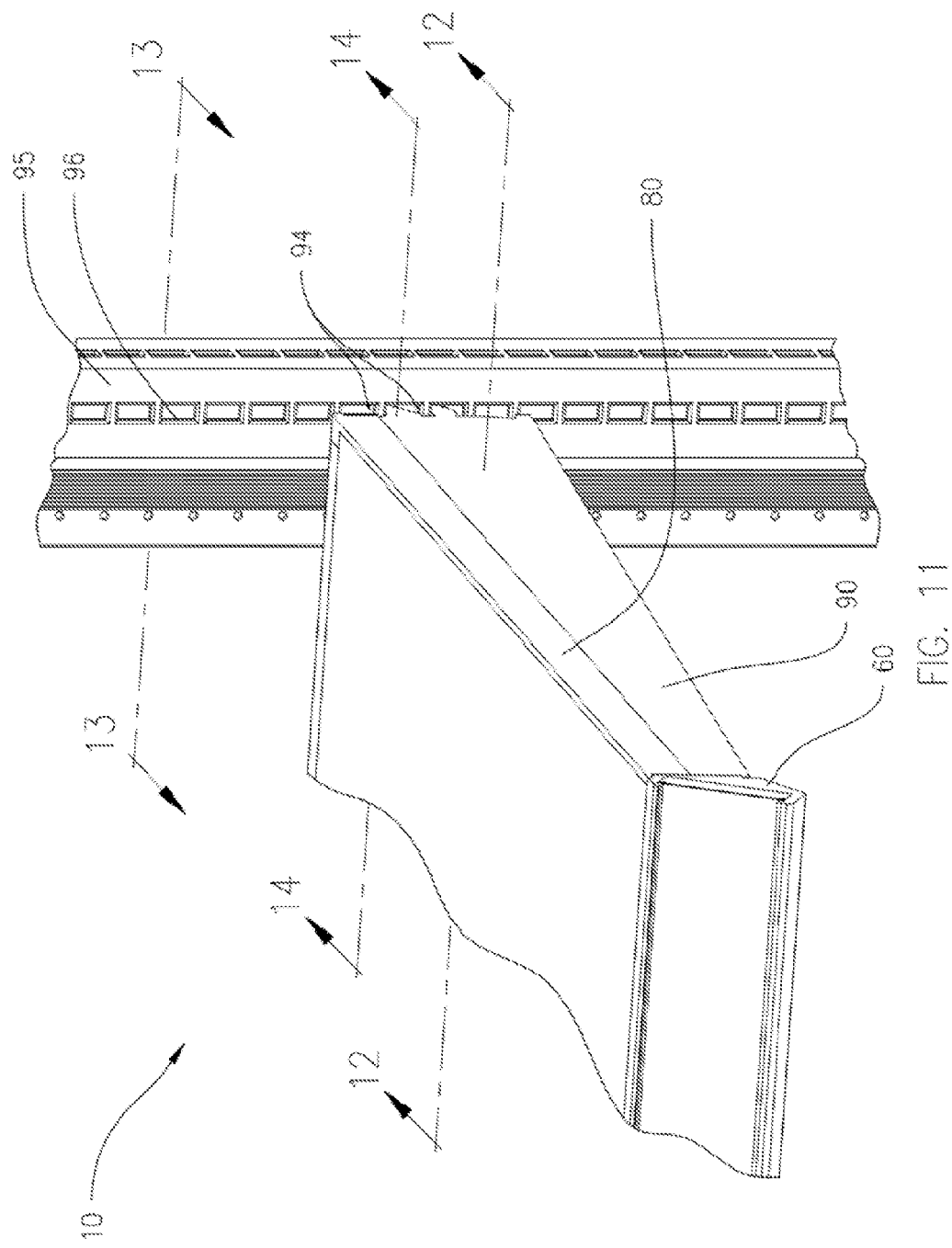
FIG. 11 shows as front-top perspective view of the smart shelf with the attached support bracket, mounted to an upright support structure of a shelf gondola.
Figure 12:
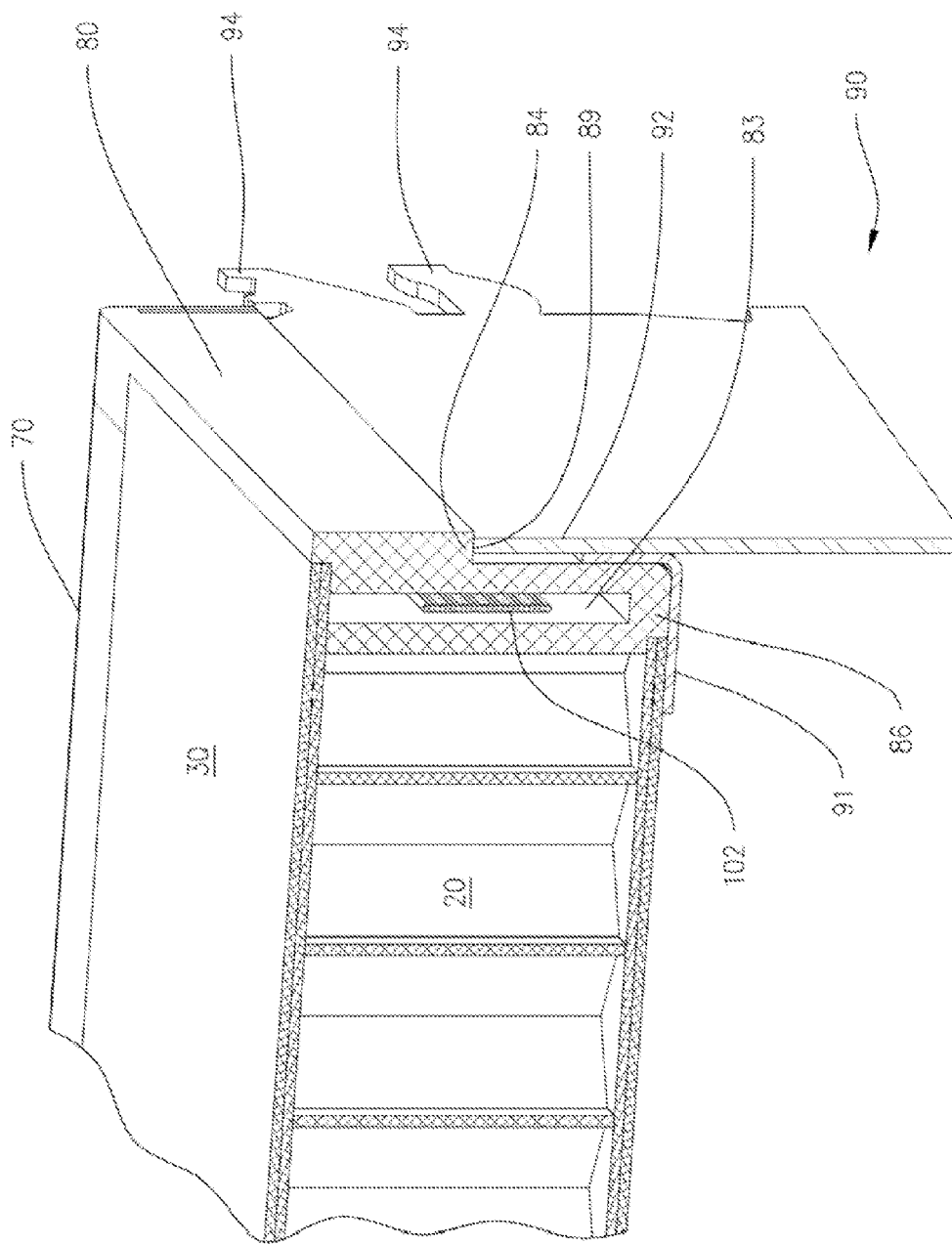
FIG. 12 shows a sectional view of the smart shelf with the attached support bracket, viewed along line 12-12 of FIG. 11.

The eight antennae 50 disposed in the top sheet 30 each connect through a lead 52 to one of a plurality of connection ends 54 that are grouped in spaced-apart series along the rear edge 34 of the top sheet, that wraps around the rear edge 34 and onto the underside of the top sheet 30, as shown in FIGS. 8, 9 and 10. Likewise, eight antennae 50 disposed in the bottom sheet 36 each connect through a lead 52 to one of a plurality of connection ends 54 grouped in spaced-apart series along the rear edge 38 of the bottom sheet, that wraps around the rear edge 38 and onto the upper side of the bottom sheet 36. An upper antennae connector 130*a* includes a forward-facing upper port 131 with a set of leads 132 corresponding to and in communication with the corresponding set of connection ends 54 of the upper antennae 50. The upper antennae connector 130*a* also includes a rearward-facing lower transfer port 135 (FIGS. 9 and 10) having a set of port leads 136 that communicates electrically with the set of leads 132. A lower antennae connector 130*b* includes a forward-facing lower port 133 with a set of leads 134 corresponding to and in communication with the connection ends 54 of the lower antennae 50. The lower antennae connector 130*b* also includes as rearward-facing upper transfer port 137 having a set of port leads 138 that communicates electrically with the set of leads 134. The forward-facing upper port 131 and lower port 133 extend through a pair of slot openings 271 and 273 formed through an upper portion and lower portion of the forward wall 72, to secure the upper port 131 and lower port 133 in position.

The rear molded member 70 also includes, secured within the cavity 73, a power and communications connector 120 which provides a means for making power and data transmission connection with a power and signal receptacle (data transmission source) in a shelving gondola within a store facility, and configured for delivering power and data transmission communication to and between the electronics and transceivers of the smart shelf, and electronics and network(s) of a shelving gondola and of the store facility.

The power and communication box 120 has a forward facing portion that includes first and second interfaces 121 and 122 (FIG. 10) that receive and provide communication with the first and second transfer ports 135 and 137 of the antennae connectors 130a and 130b. The power and communication box 120 also includes a first side interface 124 and a second side interface 125. A multi-lead ribbon cable 112, including a pair of a multi-lead ribbon cables 112a and 112b, plugs into the side interface 124 and delivers both power, communications and data signals between the power and communication box 120 and the transceivers 110.

The transceivers 110 communicate electronically with corresponding transceivers positioned within the upright supports of the gondola. The transceivers 110 are powered through the multi-lead ribbon cables 112 from the power connector 120, which also powers the antennae 50 through the antennae connectors 130a and 130b. The power and communications connector 120 also connects with a front video display panel 101 via the multi-lead ribbon cable 102 laid through the groove 83 in one of the side molded frame member 80.

Figure 14:
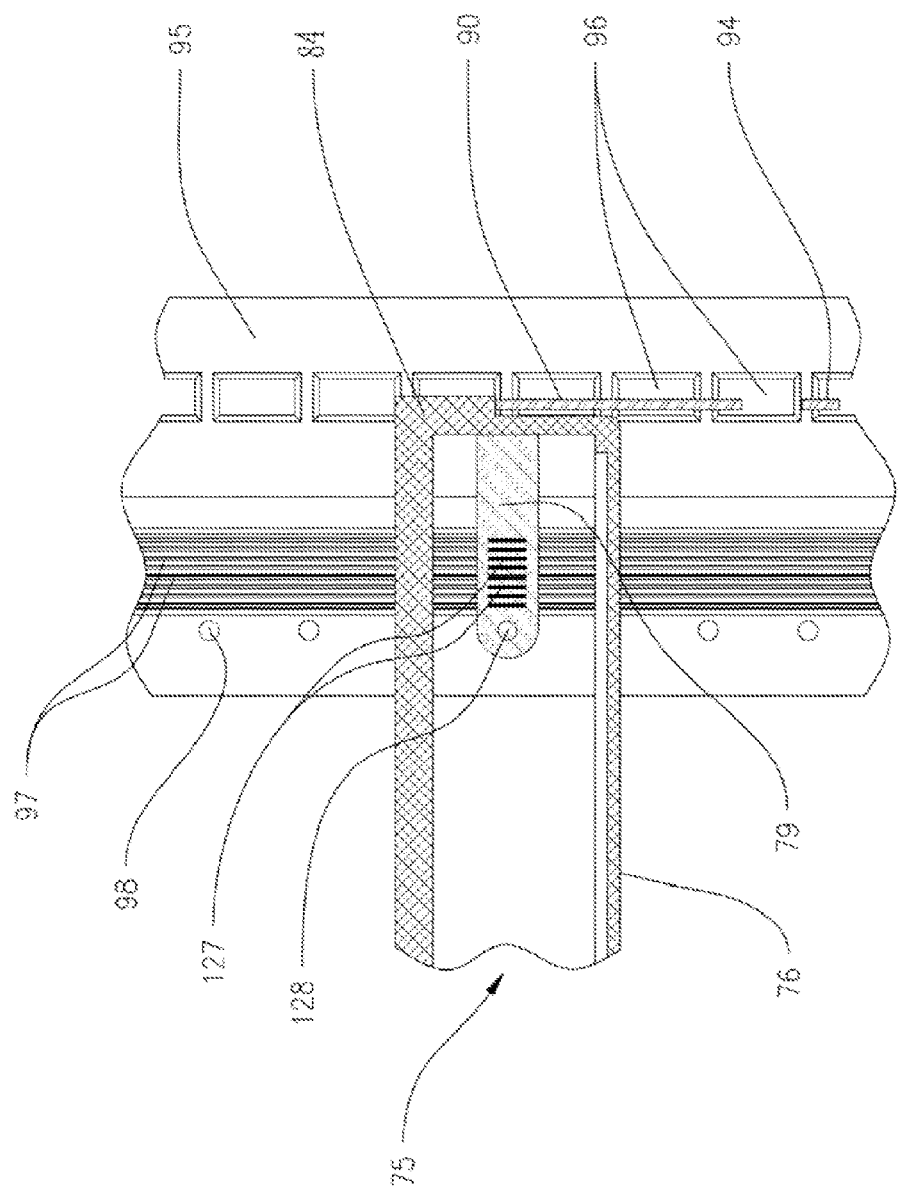
FIG. 14 shows a sectional view of the smart shelf mounted to the upright support structure of the shelf gondola, showing power and communication blades and slots, viewed from line 14-14 of FIG. 11.

The power and communication box 120 includes a plurality of planar, parallel blades 127 extending rearwardly from a back surface. The plurality of blades 127 include one or more power blades and one or more communication blades. The blades 127 are configured to engage into a corresponding plurality of slots 97 in the upright structure 95 (FIG. 14). The plurality of slots 97 include power slots and communication slots corresponding to the power and communication blades 127 of the shelf 10. The plurality of slots 97 extend vertically from a top end to a bottom end of the upright structure 95, so that the blades 127 engage as corresponding slot 97 regardless of the installation position (height) of the shelf 10 on the upright structure 95. An alignment pin 128 on the power and communication box 120 engages one of the corresponding plurality of alignment holes 98 along the height of the upright 95 adjacent the slots 97.

Figure 13:
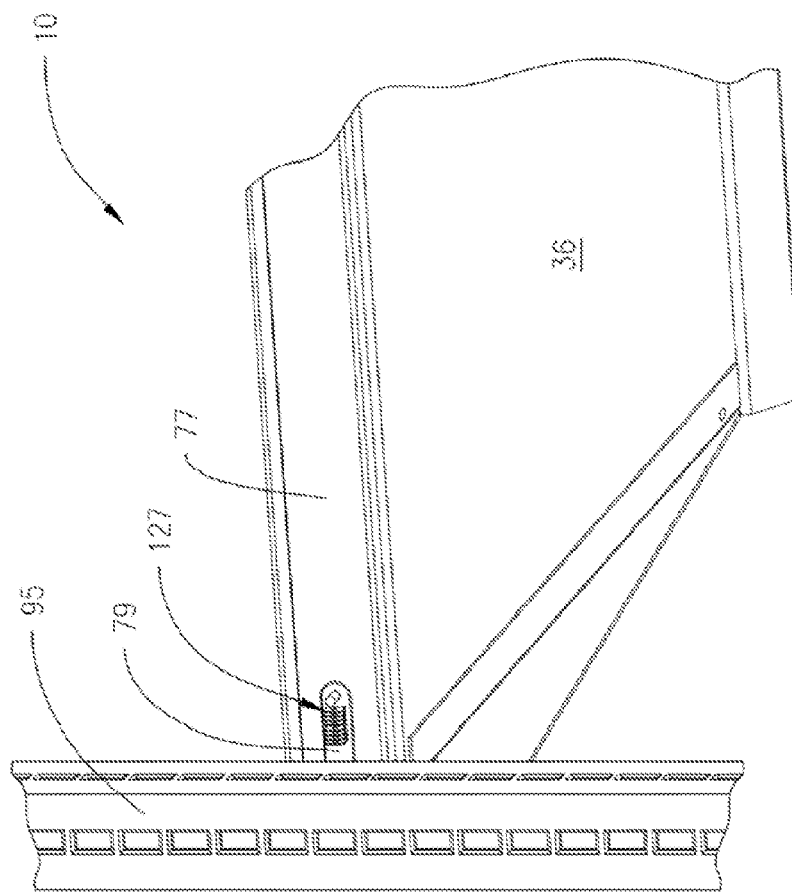
FIG. 13 shows a rear view of the smart shelf mounted to the upright support structure of the shelf gondola, viewed from line 13-13 of FIG. 11.

The transparent cover plate 77 (FIGS. 9 and 13) includes an opening 78 through which the blades 127 extend. A hatch covering 79 engages the edges of the cover plate 77 outlining the opening 78, to cover the opening 78. The hatch covering 79 includes slot openings 179 and a hole 178 to accommodate extensions of the blades 127 and the alignment pin 128.

Power to the power and communication box 120 becomes available once the shelf 10 is installed onto the upright 95. Electrical power to the shelf includes low voltage (typically direct current) for the antennae and transceivers, and standard alternating current (AC) for the video panel backlighting and functional requirements.

Gondola Securement and Power

The smart shelf of the invention provides a modular shelf that can be inserted into, removed from, and repositioned within the upright supports of a shelving gondola, and be instantly functional. The smart shelf is connected to upright supports of the gondola with side-mounting support brackets. The side-mounting support brackets are made of metal, typically stainless steel, and can be treated with an RF absorbing (or masking) material, to eliminate RFID reflections.

The side-mounting brackets can be attached to and support the smart shelf along the side molded frame members 80. As shown in FIGS. 11-14, the side molded frame members 80 include an overhanging shoulder 84 that defines an undercut 89. The side-mounting bracket 90 includes an upright wall 92, having an upper edge that supports the undercut surface 89 of the side molded frame member 80. A lower, inwardly-extending horizontal ledge 91 engages and supports the underside 86 of the side molded frame member 80. Preferably, the lower edge of the outer surface of the side molded frame member 80 is rounded to confront a rounded transition between the upright wall 92 and the inwardly-extending horizontal ledge 91 of the side molded frame member 80, to provide adequate support for the side edges of the shelf 10.

Figure 15:
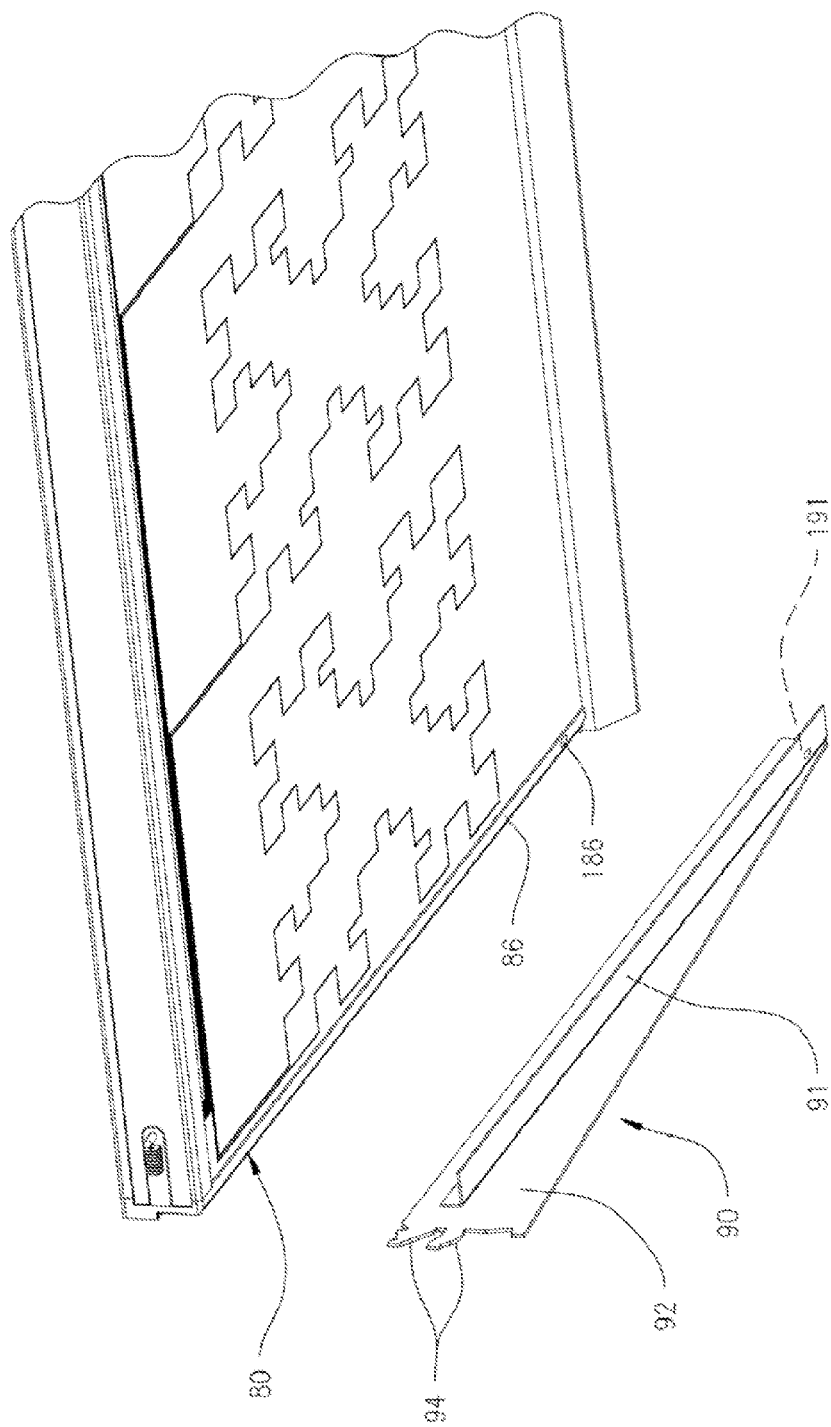
FIG. 15 shows a rear view of the side-mounting support bracket having a raised projection that engages a hole in the underside of the shelf to restrict sliding of the shelf along the support brackets.
Figure 16:
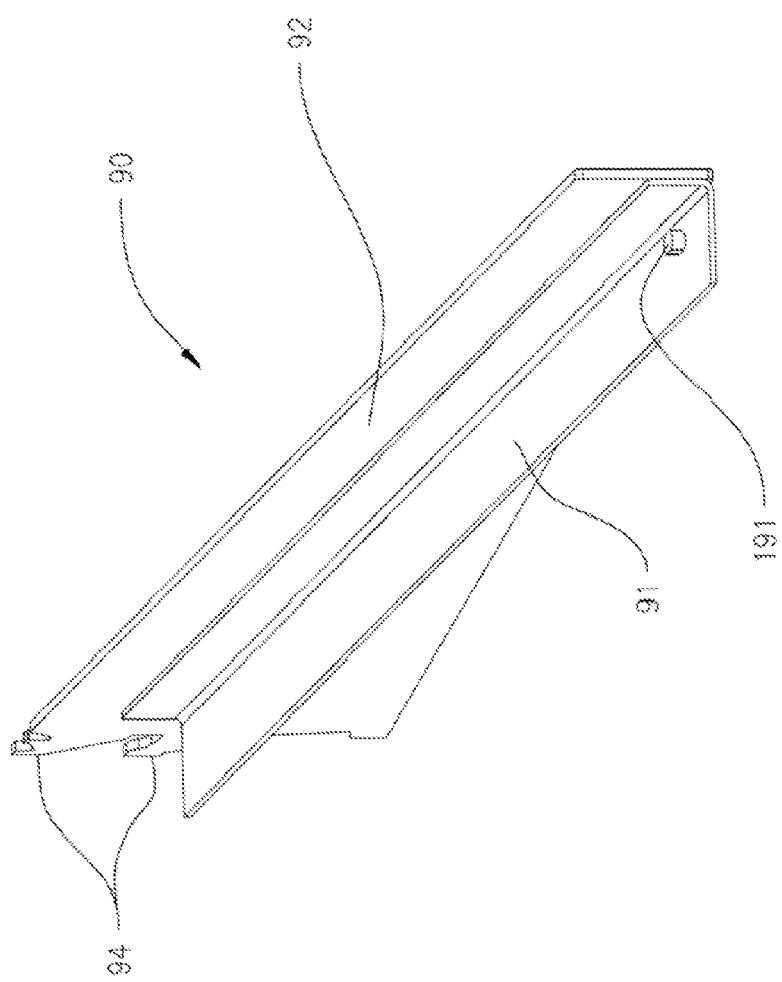
FIG. 16 shows an upper, front view of the side-mounting support bracket of FIG. 15.

FIGS. 15 and 16 show an extended (raised) projection 191 in the upper surface of the inwardly-extending horizontal ledge 91 that engages and registers inside, to a similarly-sized and -shaped hole 186 in the underside 86 of the side molded frame member 80 ensure a precise locating, and properly tight and secure fitment of the shelf 10 onto the support brackets 90, and to prevent the shelf 10 from sliding along the length of the support bracket 90. Alternatively, the extended (downward) projection can be disposed in the underside of the side molded frame member, and the hole formed into the inwardly-extending horizontal ledge. Other means for engaging the shelf with the support brackets to restrict sliding movement can be used. The specific location of the raised projection 191 along the longitudinal dimension of the horizontal ledge 91 of a particular support bracket can be tailored for a corresponding particular shelf 10 having the corresponding specific location of the hole 186 in the underside 86 of the side molded frame member 80, so that each shelf is properly matched with a support bracket of the proper and sufficient design and reinforcement (gauge and fabrication).

The side-mounting support brackets 90 also include a means for removably attaching the smart shelf 10 to an upright support member 95 of a shelving structure. The back portion of the support brackets include tabs 94, similar to conventional bracket tabs, that engage and lock within lock openings 96 in the upright supports 95 for mounting the shelf 10 to the shelving gondola. The support bracket and tabs can be configured in a variety of positions, including positioning the shelf surface horizontally, or at one or more angles.

The metal support brackets 95 are made of metal of sufficient thickness (7 gauge or thicker) for strength and rigidity, and can be made from a single part or two parts welded together.

FIG. 17 shows a perspective view of the shelf gondola 201 including a pair of upright support structures 95, a support base 210, and a vertical wall 230 including RF antennae 250. The vertical wall 230 can comprise one or more panels. In the illustrated embodiment, the vertical wall 230 includes four sub-panels 231, 232, 233, and 234, each having to plurality of RF antennae 250 fixed in the sub-panel surfaces. An opposed vertical wall can be included on the opposite side of the vertical wall 230.

The pair of upright support structures 95 are secured into a support base 210. The support base 210 can include as plurality of leveling supports 211 and/or rollers (not shown) for stabilizing and leveling the support base 210 in a use position, or moving the support base 210 to a use position. The support base also includes power components 212 for providing power to the vertical wall(s) 210 and to the smart shelves, via the power slots among the power and communication slots 97 in the upright support structures 95. Mains power is delivered to the support base 210 from receptacles in the store. The support base 210 also includes communication components 214 for providing communications signals to and from the electrical components of the smart shelves, also via communication slots among the power and communication slots 97 in the upright support structures 95. Such communication components include the RF antennae 50, 250, the video display panel 101, the transceivers 110, a network interface for connecting the gondola to a local network, for both sending and receiving signals.

I claim:

1. A modular composite smart shelf, configured to read, via Radio Frequency Identification (RFID), real-time inventory of RFID tagged retail goods displayed thereon, comprising:
   a) a non-metallic low density core having opposed top and bottom faces, and an outer perimeter including a rear edge, a front edge, and opposed side edges, each defined by a corresponding rear face, front face, and opposed side faces;
   b) a molded frame secured to the outer perimeter of the core including the rear face, the front face, and opposed side faces, the molded frame further including:
      i) an elongated rear molded frame member affixed to the rear face of the core, having a top surface and a cavity with a rear-facing opening along a length of the elongated rear molded frame member;
      ii) an elongated front molded frame member affixed to the front face of the core, having a top surface, and the front molded frame member having a separate video display panel mounted on the front edge of the shelf; and
      iii) opposed side molded frame members connecting the rear molded frame member to the front molded member, each side molded frame member having a top surface, a rear end, a front end, and an underside;
   c) a thermoplastic or resinous sheet including a top thermoplastic or resinous sheet secured to the top face of the core and a bottom thermoplastic or resinous sheet secured to the bottom face of the core, the thermoplastic or resinous sheet further including a plurality of antennae embedded within at least one of the top sheet and the bottom sheet;
   d) an RFID transceiver in electrical communication with the plurality of antennae, secured within the cavity of the rear molded frame member; and
   e) a power and communications connector secured within the cavity of the rear molded frame member, and connected in electronic communication with the RFID transceiver, and with the front video display panel, wherein the modular shelf is operable to be electronically plugged, via the power and communications connector, into a power and signal receptor of a shelving structure comprising a plurality of shelves and immediately function to read RFID tagged goods on the smart shelf.

2. The modular composite smart shelf according to claim 1, wherein an edge of the thermoplastic or resinous top sheet covers at least a portion of the top surface of the molded frame.

3. The modular composite smart shelf according to claim 1, wherein the antennae is a fractal (or comparable) antennae.

4. The modular composite smart shelf according to claim 1, wherein the thermoplastic or resinous sheet comprises a composite material comprising a thermoplastic resin and a reinforcing filler material.

5. The modular composite smart shelf according to claim 1, further including a closure covering a portion of the rear-facing opening of the rear molded frame member.

6. The modular composite smart shelf according to claim 5, wherein the closure is transparent.

7. The modular composite smart shelf according to claim 1, wherein the power and communications connector includes a plurality of power and communication blades rearwardly extending through the rear-facing opening of the rear molded frame member, configured to engage a plurality of power and communication slots in an upright support member of the shelving structure to which the smart shelf may be attached.

8. The modular composite smart shelf according to claim 1, further including a pair of support brackets, each support bracket configured to attach to one of the opposed side molded frame members, each support bracket including a horizontal ledge for supporting the underside of the side molded frame member, an upper edge, and a means for removably attaching the smart shelf to an upright support member of the shelving structure; and wherein the opposed side molded frame members further include an overhanging edge defining an undercut for supporting the shoulder in the side molded frame member.

9. The modular composite smart shelf according to claim 8, wherein the pair of support brackets are RF absorbing.

10. The modular composite smart shelf according to claim 1, wherein at least one of the opposed side molded frame members has a channel extending from the rear end to the front end, wherein the channel provides a means for the electronic communication connection between the power and communications connector and the front video display panel.

11. The modular composite smart shelf according to claim 1, wherein the one or more antennae has a connection lead disposed in or extending from a peripheral edge of the sheet.

12. The modular composite smart shelf according to claim 1, wherein the non-metallic core comprises a honeycomb-core made of a thermoplastic.

13. The modular composite smart shelf according to claim 1, further including the front video display panel mounted to the front molded frame member.

14. The modular composite smart shelf according to claim 1, wherein the molded frame comprises an extruded thermoplastic.

15. The modular composite smart shelf according to claim 1, wherein the molded frame comprises a composite material comprising a thermoplastic resin and a reinforcing filler material.

16. The modular composite smart shelf according to claim 1, wherein the rear molded frame member contains one or more electronic components for communication with or between the RFID transceiver, the front video display panel, and with a power or communication electronic device in the shelving structure.

* * * * *